(12) United States Patent
Jang et al.

(10) Patent No.: US 10,684,917 B2
(45) Date of Patent: Jun. 16, 2020

(54) MOBILE TERMINAL AND DATA BACKUP AND RESTORATION METHOD THEREOF

(71) Applicant: LG ELECTRONICS INC., Seoul (KR)

(72) Inventors: Harim Jang, Seoul (KR); Sunmi Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/072,209

(22) PCT Filed: Feb. 16, 2016

(86) PCT No.: PCT/KR2016/001550
§ 371 (c)(1),
(2) Date: Jul. 24, 2018

(87) PCT Pub. No.: WO2017/142104
PCT Pub. Date: Aug. 24, 2017

(65) Prior Publication Data
US 2019/0034283 A1  Jan. 31, 2019

(51) Int. Cl.
*G06F 11/14* (2006.01)
*G06K 19/07* (2006.01)
(Continued)

(52) U.S. Cl.
CPC .......... *G06F 11/1448* (2013.01); *G06K 19/07* (2013.01); *G06Q 20/16* (2013.01); *G06Q 20/32* (2013.01); *G06Q 20/3226* (2013.01); *G06Q 20/3278* (2013.01); *G06Q 20/363* (2013.01); *H04B 5/0031* (2013.01); *H04W 76/14* (2018.02); *G06Q 20/40* (2013.01)

(58) Field of Classification Search
CPC . G06F 11/1448; G06F 11/1458; G06Q 20/16; G06Q 20/32; H04B 5/0031
USPC .................................................. 711/161, 162
See application file for complete search history.

(56) References Cited

U.S. PATENT DOCUMENTS

| | | | |
|---|---|---|---|
| 2013/0132282 A1* | 5/2013 | Shakkarwar | G06Q 20/382 705/64 |
| 2014/0046784 A1* | 2/2014 | Prakash | G06Q 20/36 705/17 |
| 2019/0007829 A1* | 1/2019 | Hurst | H04L 41/5064 |

FOREIGN PATENT DOCUMENTS

| | | |
|---|---|---|
| KR | 10-2012-0066051 A | 6/2012 |
| KR | 10-2013-0029243 A | 3/2013 |

(Continued)

*Primary Examiner* — Than Nguyen
(74) *Attorney, Agent, or Firm* — Birch, Stewart, Kolasch & Birch, LLP

(57) ABSTRACT

A mobile terminal for performing backup and restoration of data according to an embodiment of the present invention includes a wireless communication unit configured to connect to another mobile terminal, a display unit, a memory configured to store a backup application for performing the backup and restoration of the data, and a controller configured to make a request to perform near field communication (NFC) tagging with the other mobile terminal in order to receive a backup file including the data from the other mobile terminal, configured to connect to the other mobile terminal through the wireless communication unit on the basis of the NFC tagging, and configured to restore the data included in the backup data received from the other mobile terminal.

17 Claims, 45 Drawing Sheets

(51) Int. Cl.
*G06Q 20/32* (2012.01)
*G06Q 20/36* (2012.01)
*G06Q 20/16* (2012.01)
*H04W 76/14* (2018.01)
*H04B 5/00* (2006.01)
*G06Q 20/40* (2012.01)

(56) References Cited

FOREIGN PATENT DOCUMENTS

| | | |
|---|---|---|
| KR | 10-2015-0001875 A | 1/2015 |
| KR | 10-2015-0011896 A | 2/2015 |
| KR | 10-2015-0012886 A | 2/2015 |

\* cited by examiner

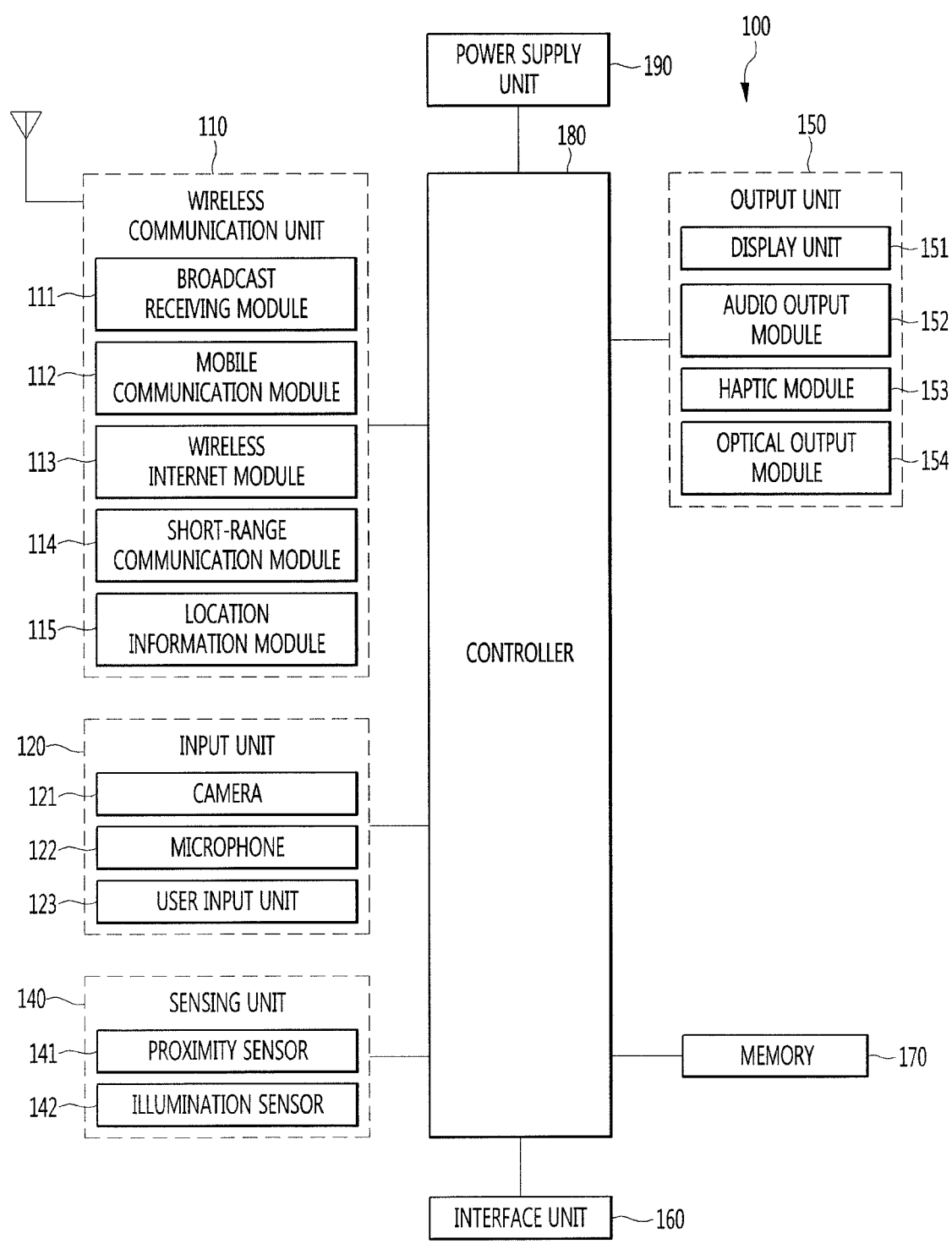

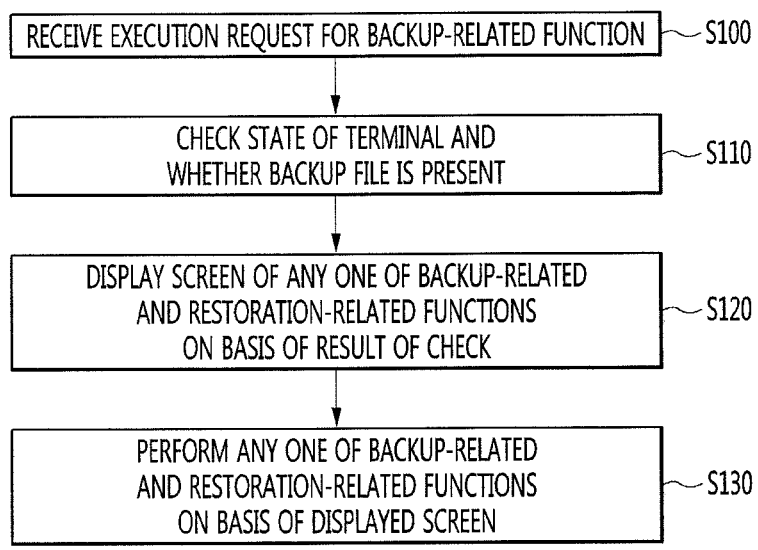

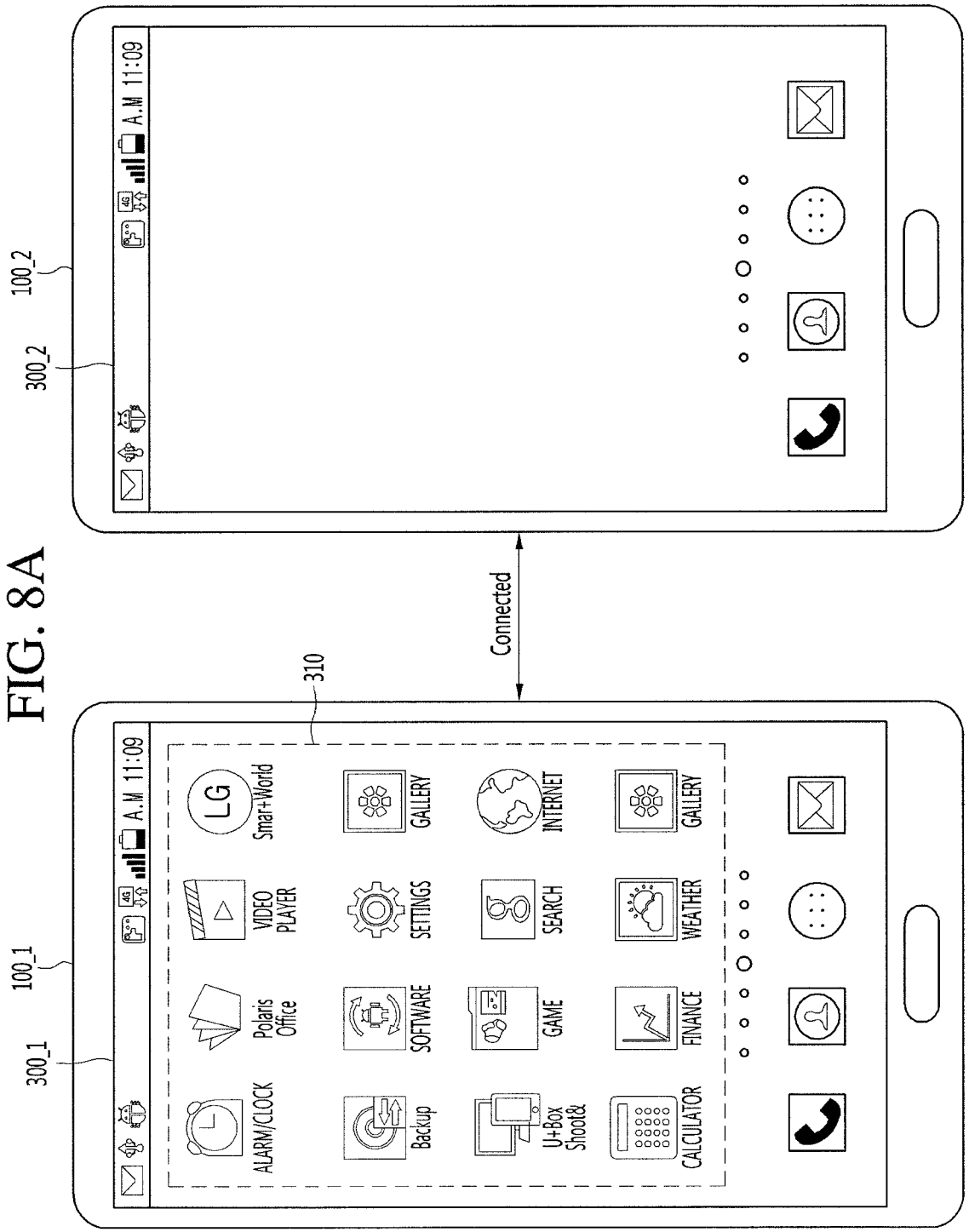

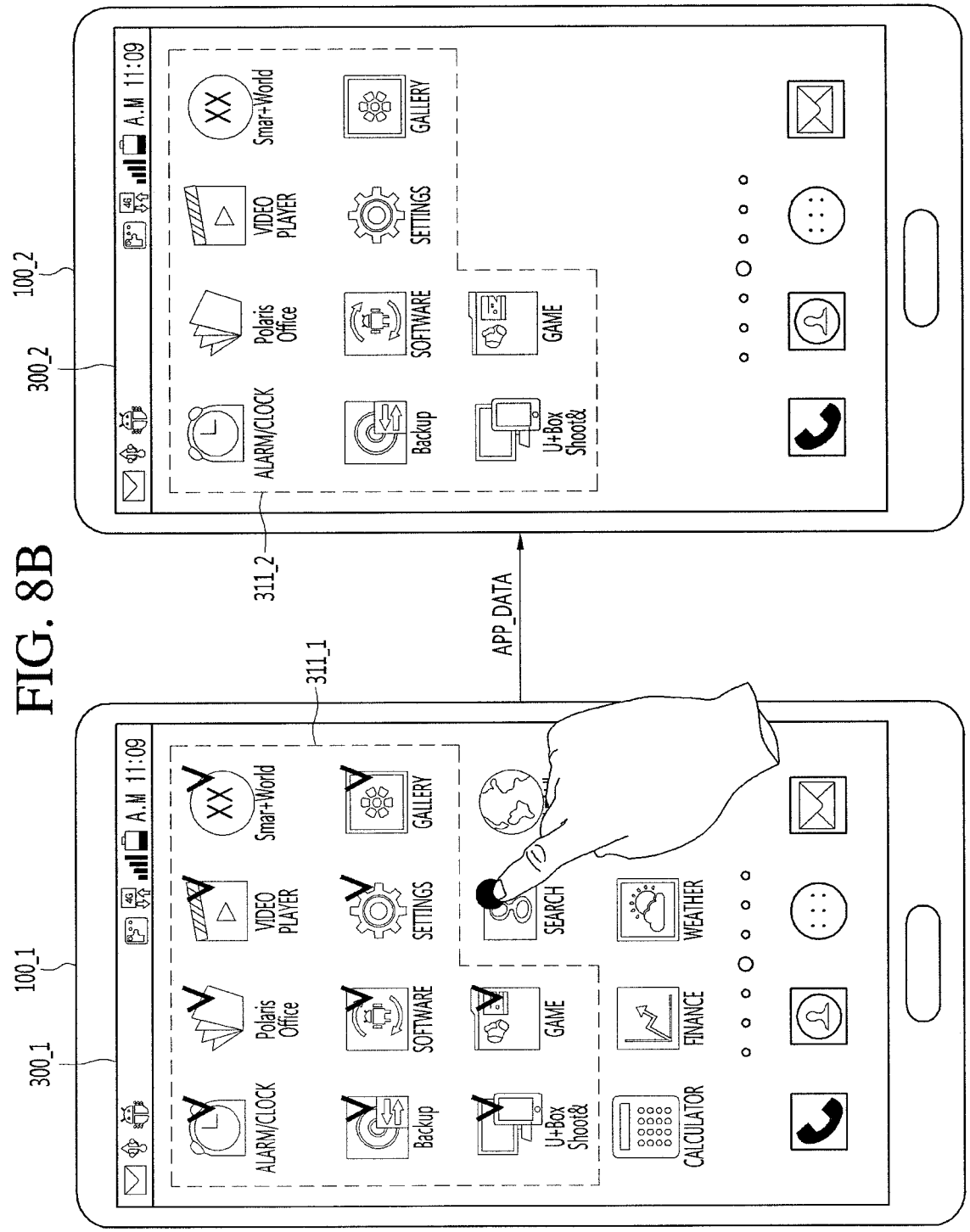

FIG. 16C
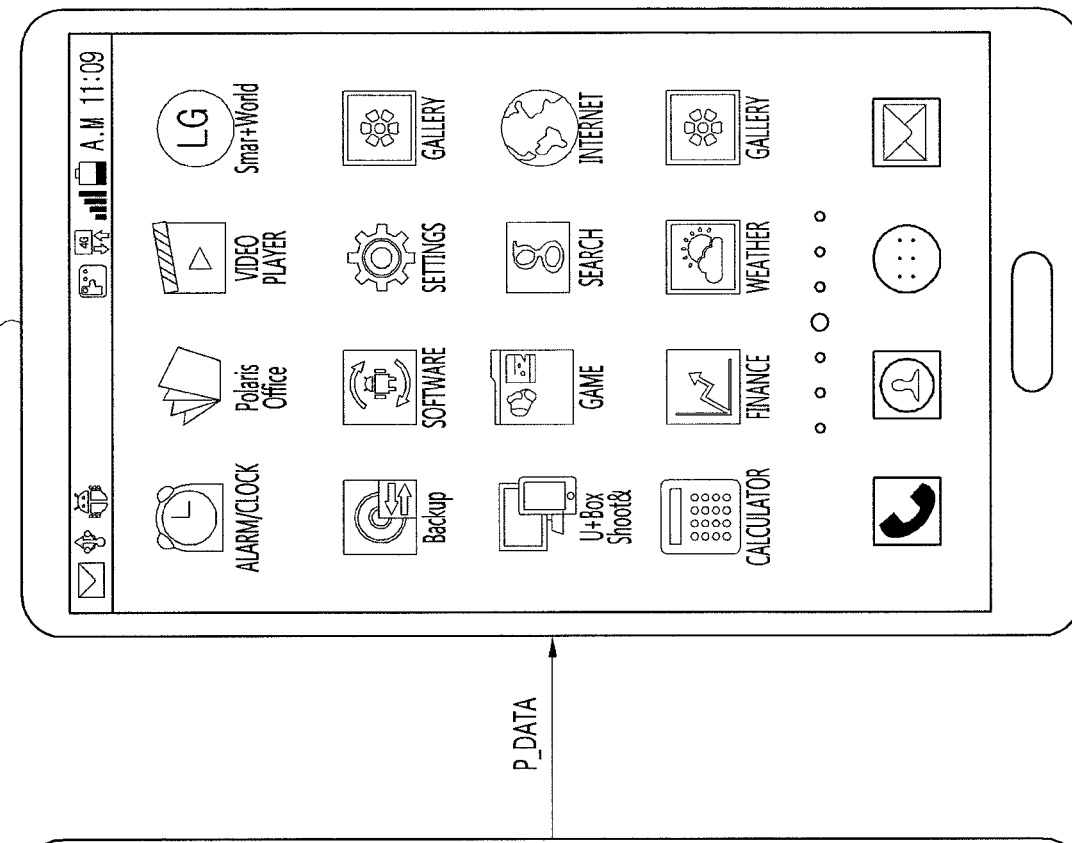
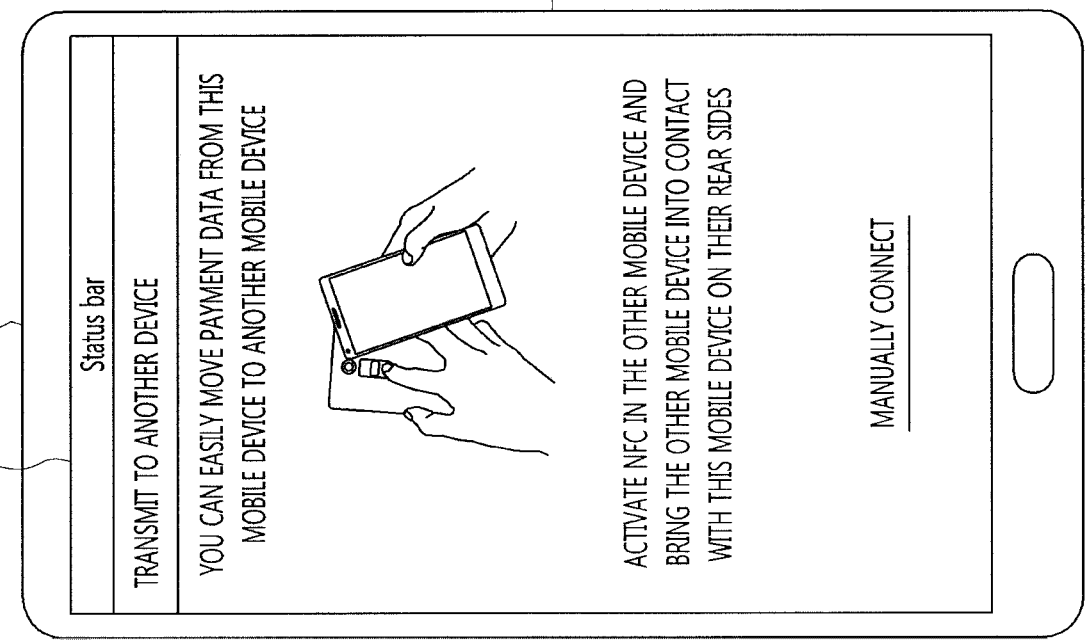

FIG. 17A
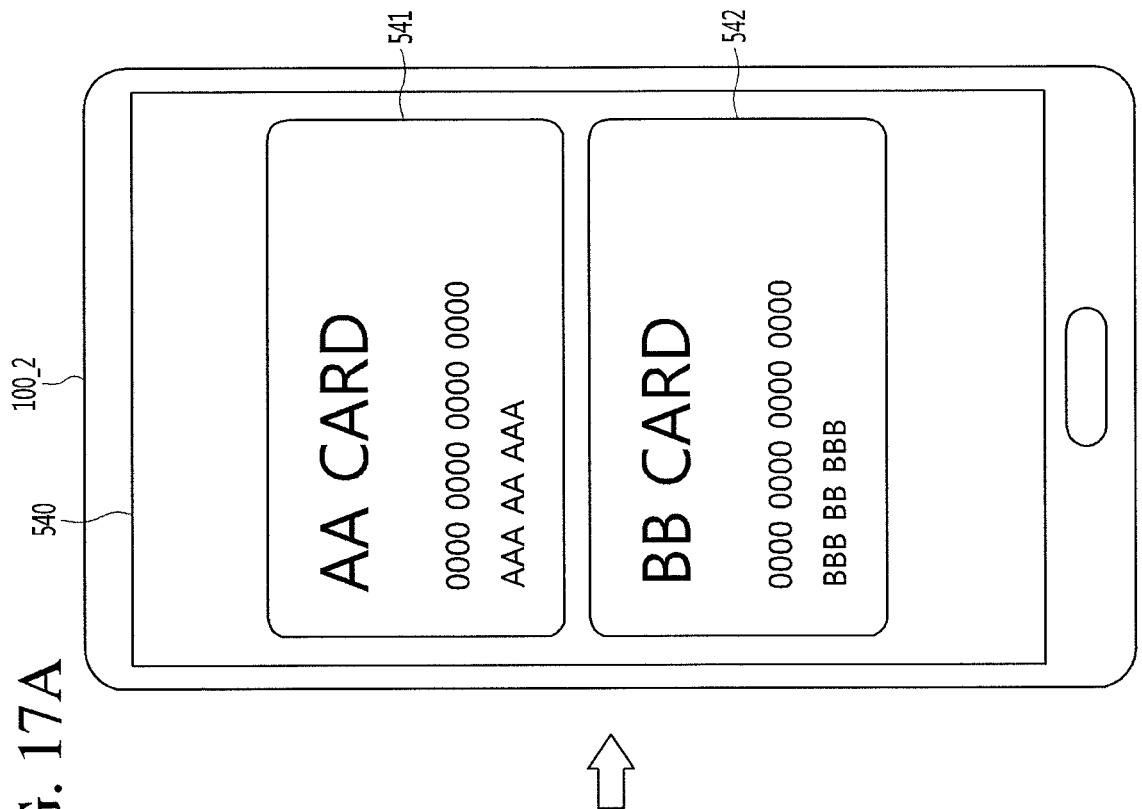
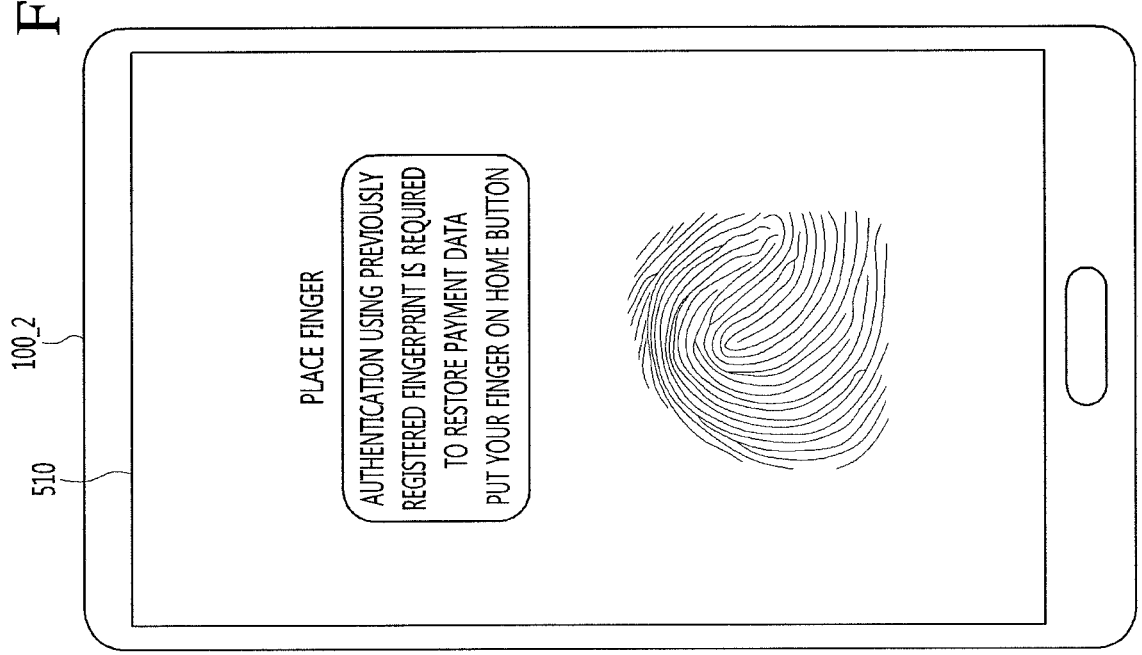

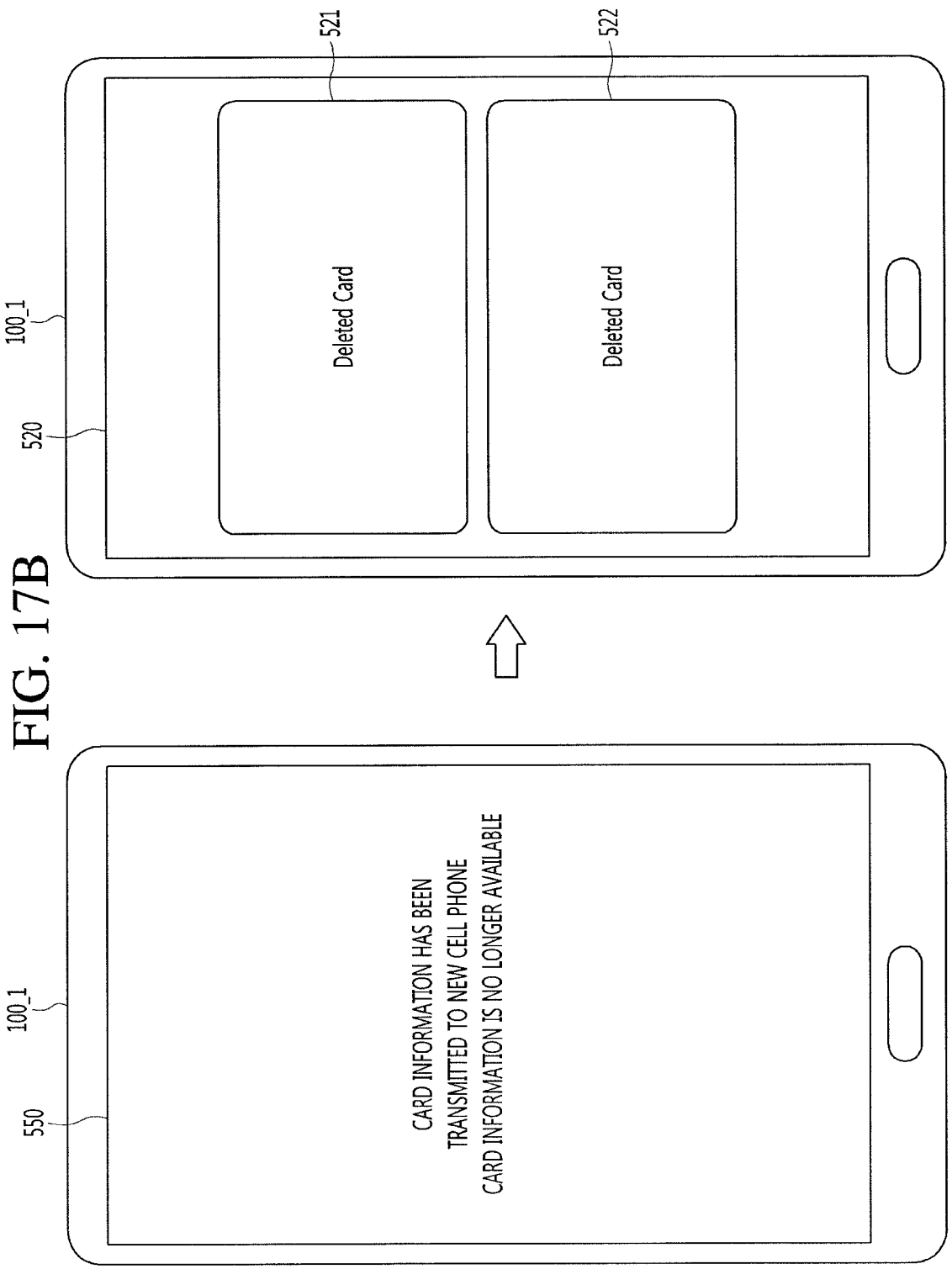

MOBILE TERMINAL AND DATA BACKUP AND RESTORATION METHOD THEREOF

CROSS REFERENCE TO RELATED APPLICATIONS

This application is the National Phase of PCT/KR2016/001550 filed on Feb. 16, 2016, which is hereby expressly incorporated by reference into the present application.

TECHNICAL FIELD

The present invention relates to a mobile terminal and a data backup and restoration method thereof, and more particularly, to a method in which a mobile terminal connects to another mobile terminal and backs up and restores data of the other mobile terminal in the mobile terminal.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Generally, mobile terminals such as a smartphone have shorter replacement periods than those of home appliances such as a television (TV). For the replacement of a mobile terminal, a user may use a data backup and restoration function for moving data from an old mobile terminal to a new mobile terminal. In particular, during data backup and restoration, in order to implement a new mobile terminal to have the same usage environment as an old mobile terminal, even internal data of applications may also be backed up and restored.

Various backup and restoration applications being provided so far have a complicated process for performing backup and restoration, and therefore, there is a need for a method of enabling a user to conveniently back up and restore data. In addition, due to the recent development of the pin-tech market, payment information related to payment may be stored in mobile terminals. Since such payment information is sensitive to security, there is a need for a method of safely back up and restore the payment information.

DETAILED DESCRIPTION OF THE INVENTION

Technical Problem

The present invention is directed to provide a method for simplifying a process that is performed when data of a mobile terminal is backed up and restored in another mobile terminal.

Technical Solution

A mobile terminal for performing backup and restoration of data according to an embodiment of the present invention includes a wireless communication unit configured to connect to another mobile terminal, a display unit, a memory configured to store a backup application for performing the backup and restoration of the data, and a controller configured to make a request to perform near field communication (NFC) tagging with the other mobile terminal in order to receive a backup file including the data from the other mobile terminal, configured to connect to the other mobile terminal through the wireless communication unit on the basis of the NFC tagging, and configured to restore the data included in the backup data received from the other mobile terminal.

The controller may check whether the mobile terminal is in an initial state and whether the backup file is present in the mobile terminal in response to an execution request for the backup application. The controller may make a request for the NFC tagging with the other mobile terminal when the mobile terminal is in the initial state and the backup file is not present. The initial state may be a state which corresponds to a reference time after an initial setting completion time of the mobile terminal and in which data restoration is not performed.

Depending on the embodiment, when the mobile terminal is in the initial state, the controller may display an item for inducing execution of the backup application on the display unit.

The mobile terminal and the other mobile terminal may be connected through Wi-Fi Direct, and the controller may transmit Wi-Fi access point information, media access control (MAC) address, and version information of the backup application to the other mobile terminal during the NFC tagging and may connect to the other mobile terminal through the Wi-Fi Direct on the basis of a result of the transmission.

When the connection to the other mobile terminal fails, the controller may display, on the display unit, a message for inducing installation or version update of the backup application of the other mobile terminal.

The controller may receive the backup file transmitted when an application icon displayed on a screen of the other mobile terminal is selected and may restore application backup data included in the received backup file, and the application backup data may be data related to an application corresponding to the selected application icon.

When payment data is included in the backup file received from the other mobile terminal, the controller may request authentication for restoring the payment data, and the payment data may include card information for payment.

When the payment data is restored as the authentication is completed, the controller may transmit a restoration notification for deleting payment data stored in the other mobile terminal to the other mobile terminal.

The controller may detect installation of an external apparatus in which payment data is stored, request authentication of the payment data on the basis of a result of the detection, and automatically execute or install an application associated with the payment data when the authentication is completed.

The controller may receive a backup request for payment data stored in the mobile terminal, request authentication for encryption and transmission of the payment data in response to the received backup request, transmit a backup file including the payment data to the other mobile terminal connected to the mobile terminal when the authentication is completed, and delete the payment data when a restoration notification indicating that the payment data has been restored is received from the other mobile terminal.

A method of backing up and restoring data of a mobile terminal according to an embodiment of the present invention may include requesting NFC tagging with another mobile terminal in order to receive a backup file including data to be restored from the other mobile terminal, connecting to the other mobile terminal on the basis of the NFC tagging, receiving the backup file from the other mobile terminal, and restoring the data included in the received backup file.

A non-transitory storage medium according to an embodiment of the present invention may store a program readable by a computer for performing the method of backing up and restoring data of the mobile terminal.

Advantageous Effects

According to various embodiments of the present invention, it is possible to shorten a process of connecting the mobile terminals by using near field communication (NFC) tagging when the mobile terminals are connected to back up and restore data, thus improving a user's convenience.

In addition, it is possible for the mobile terminal to conveniently provide suitable functions according to the state of the mobile terminal and the presence or absence of the backup data.

According to various embodiments of the present invention, it is possible to improve stability and security by the mobile terminal performing an authentication procedure during backup and restoration of payment data.

DESCRIPTION OF THE DRAWINGS

FIG. 1 is a block diagram of a mobile terminal in accordance with the present disclosure.

FIG. 2 is a flowchart illustrating an operation in which a mobile terminal provides a backup-related function according to an embodiment of the present invention.

FIGS. 8A and 8B are views showing an embodiment of an operation of restoring data of the first mobile terminal in the second mobile terminal.

FIGS. 16A to 17B are views showing another embodiment of an operation of restoring, in the second mobile terminal, payment data stored in the first mobile terminal.

BEST MODE

Figure 3A:
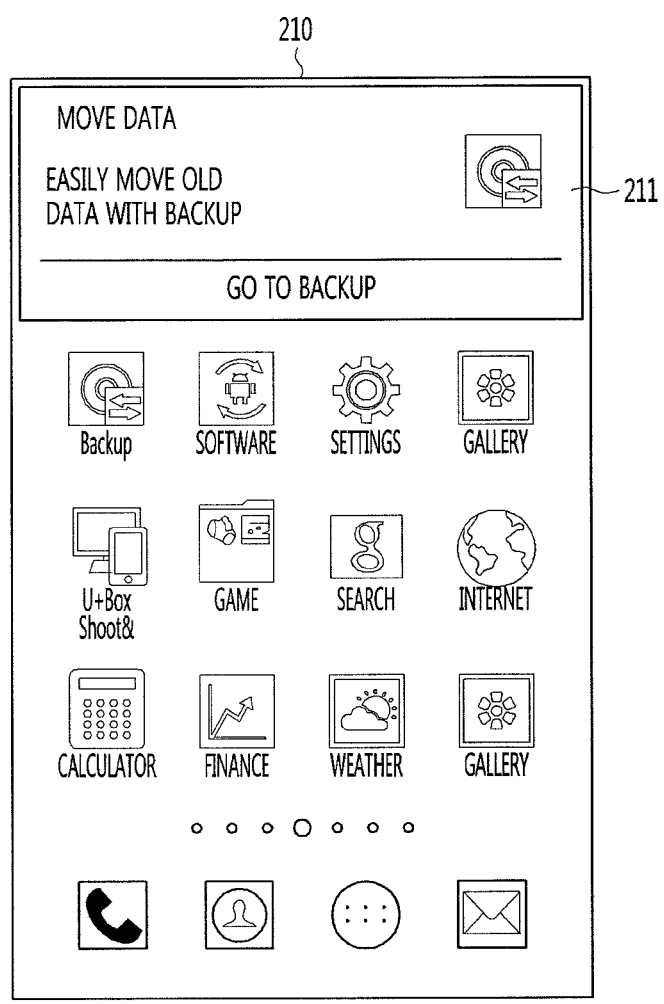
FIGS. 3A to 3C are diagrams showing examples of a notification or badge that is displayed by a mobile terminal to induce execution of a backup-related function according to an embodiment of the present invention.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Hereinafter, embodiments of the present invention will be described in detail with reference to the accompanying drawings.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170.

As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the components may operate in cooperation with each other to implement an operation, control, or control method of a mobile terminal according to various embodiments to be described below. Also, the operation, control, or control method of the mobile terminal may be implemented on the mobile terminal by driving at least one application program stored in the memory 170.

Hereinafter, the components listed above will be described in more detail with reference to FIG. 1 before various embodiments implemented through the aforementioned mobile terminal 100 are described.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

A communication system which is operable with the variously described mobile terminals will now be described in more detail.

Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system.

A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1 is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server.

The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal.

Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

Various embodiments described herein may be implemented in a computer-readable medium, a machine-readable medium, or similar medium using, for example, software, hardware, or any combination thereof.

FIG. 2 is a flowchart illustrating an operation in which a mobile terminal provides a backup-related function according to an embodiment of the present invention.

In this specification, a backup-related function provided by the mobile terminal 100, such as a backup or restoration function, may refer to a function provided by a backup application installed and executed in the mobile terminal 100. The backup application may be installed in the memory 170 when the mobile terminal 100 is released or may be downloaded from a server (e.g., an application store) for providing an application download service and installed in the memory 170. By executing the backup application, the controller 180 may provide the backup-related function and various kinds of functions described in the specification.

Referring to FIG. 2, the mobile terminal 100 may receive an execution request for a backup-related function (S100). The backup-related function may include a backup function for backing up data of the mobile terminal 100, a restoration function for restoring data using a backup file stored in the mobile terminal 100 or a backup file received from another mobile terminal, etc. The backup file may include data to be restored.

The execution request for the backup-related function may correspond to an execution request for an backup application installed in the mobile terminal 100. For example, the execution request may be a touch input applied to a backup application icon displayed on a home screen or an application list screen (or an application drawer screen) of the mobile terminal 100, but is not limited thereto.

In particular, when the mobile terminal 100 is in an initial state, the controller 180 may display a notification or a badge as an item for inducing execution of the backup-related function. The initial state may refer to a state in which data is not restored within a reference time (or a reference date) after initial settings of the mobile terminal 100 is completed. For example, the initial state may refer to a state in which data is not restored within a reference time after a user purchases the mobile terminal 100 and completes initial settings thereof or within a reference time after a user initializes the mobile terminal 100 and completes initial settings thereof.

An embodiment of the notification or badge displayed by the controller 180 will be described in more detail with reference to FIGS. 3A to 3C.

Figure 3B:
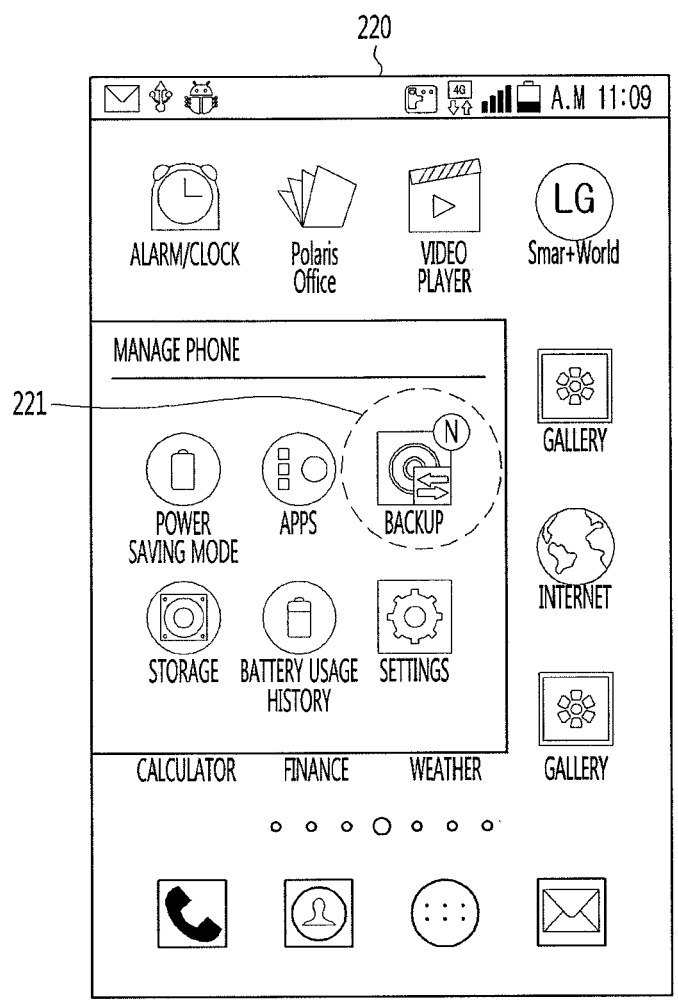
Figure 3C:
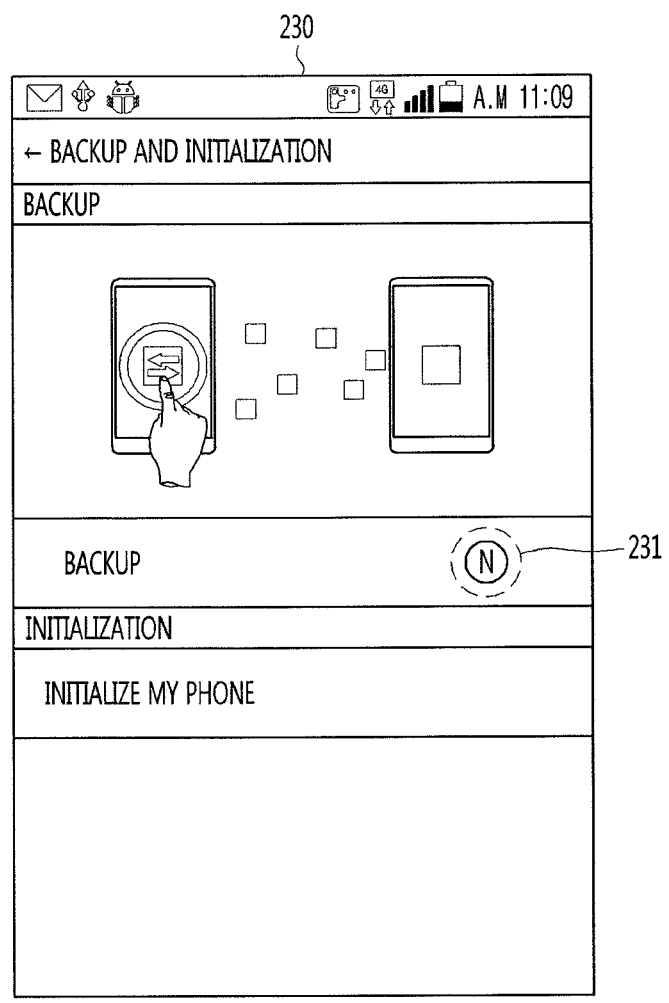

FIGS. 3A to 3C are diagrams showing examples of a notification or badge that is displayed by a mobile terminal to induce execution of a backup-related function according to an embodiment of the present invention.

Referring to FIG. 3A, the controller 180 may display the notification for inducting the execution of the backup-related function in the form of a heads-up notification (211). In this case, the execution request for the backup-related function, which was described with reference to FIG. 2, may be a touch input for the heads-up notification 211.

Referring to FIG. 3B, a backup application icon 221 that may be displayed on the home screen, the application list screen, or a folder of the mobile terminal 100 may include a badge for inducing execution of the backup-related function (an backup application). That is, the controller 180 may induce execution of the backup application by displaying the badge on the backup application icon 221. The controller 180 may execute the backup application by receiving a touch input for the backup application icon 221.

Referring to FIG. 3C, the controller may induce execution of the backup-related function (the backup application) by displaying the badge in a backup list 231 of a setting function of the mobile terminal 100. The controller 180 may execute the backup-related function (the backup application) by receiving a touch input for the backup list 231.

The notification or badge shown in FIGS. 3A to 3C may be displayed when the mobile terminal 100 is in an initial state, but is not limited thereto. For example, although the mobile terminal 100 is not in the initial state, the controller 180 may display the notification or badge when a backup file is received from another mobile terminal.

The description of FIG. 2 will be resumed.

The mobile terminal 100 may check a mobile terminal state and whether a backup file is present in response to the received execution request (S110) and may display a screen for any one function related to backup and restoration on the basis of a result of the check (S120).

On the basis of whether the mobile terminal 100 is in the initial state and whether a backup file is stored in the memory 170 of the mobile terminal 100, the controller 180 may display a screen providing any one of the backup and restoration functions provided by the backup application.

Steps S110 and S120 will be described in detail with reference to FIGS. 4A and 4B.

Figure 4A:
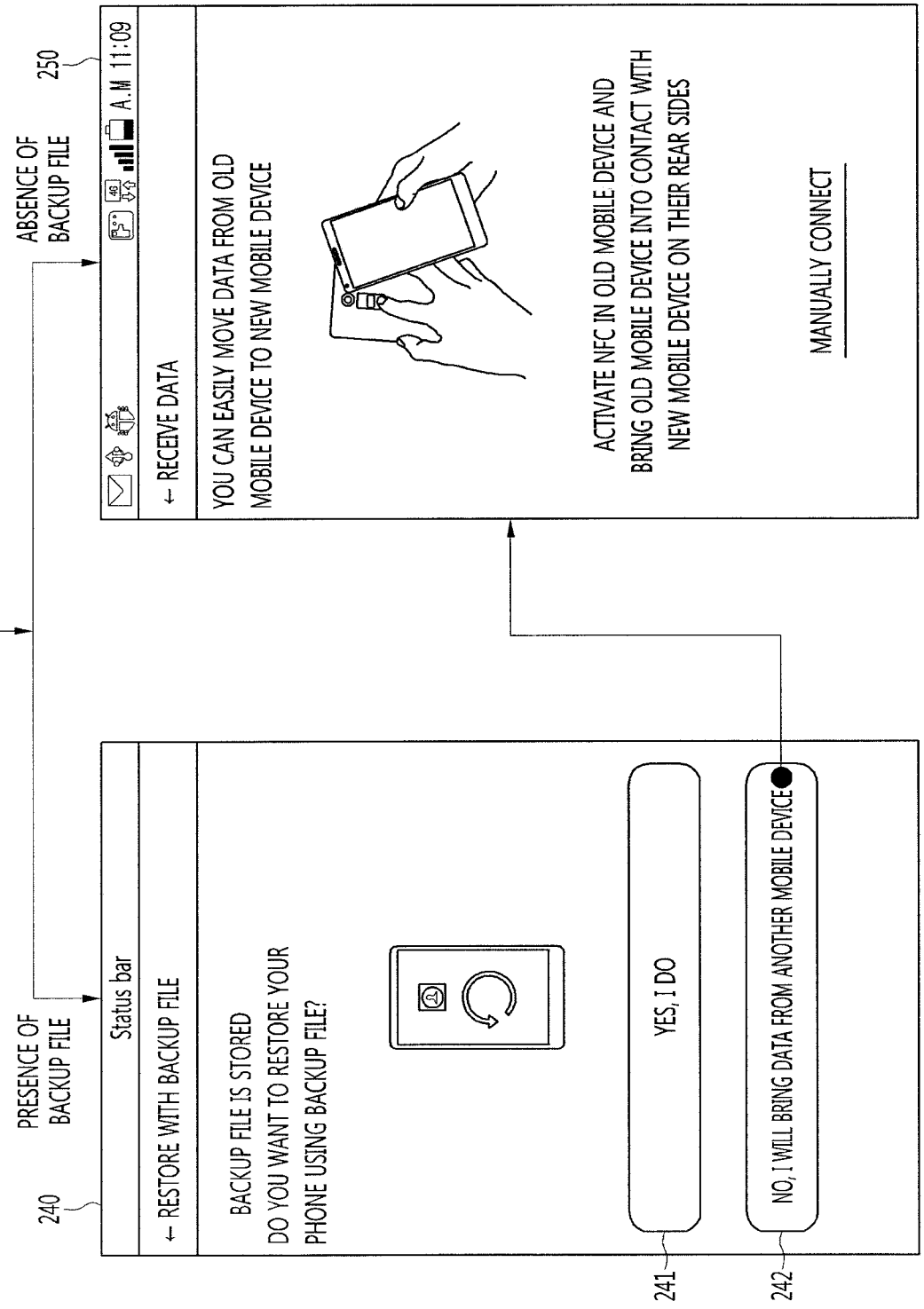
FIGS. 4A and 4B are diagrams illustrating an operation in which a mobile terminal displays different backup-related function screens on the basis of status of the mobile terminal or whether a backup file is present according to an embodiment of the present invention.
Figure 4B:
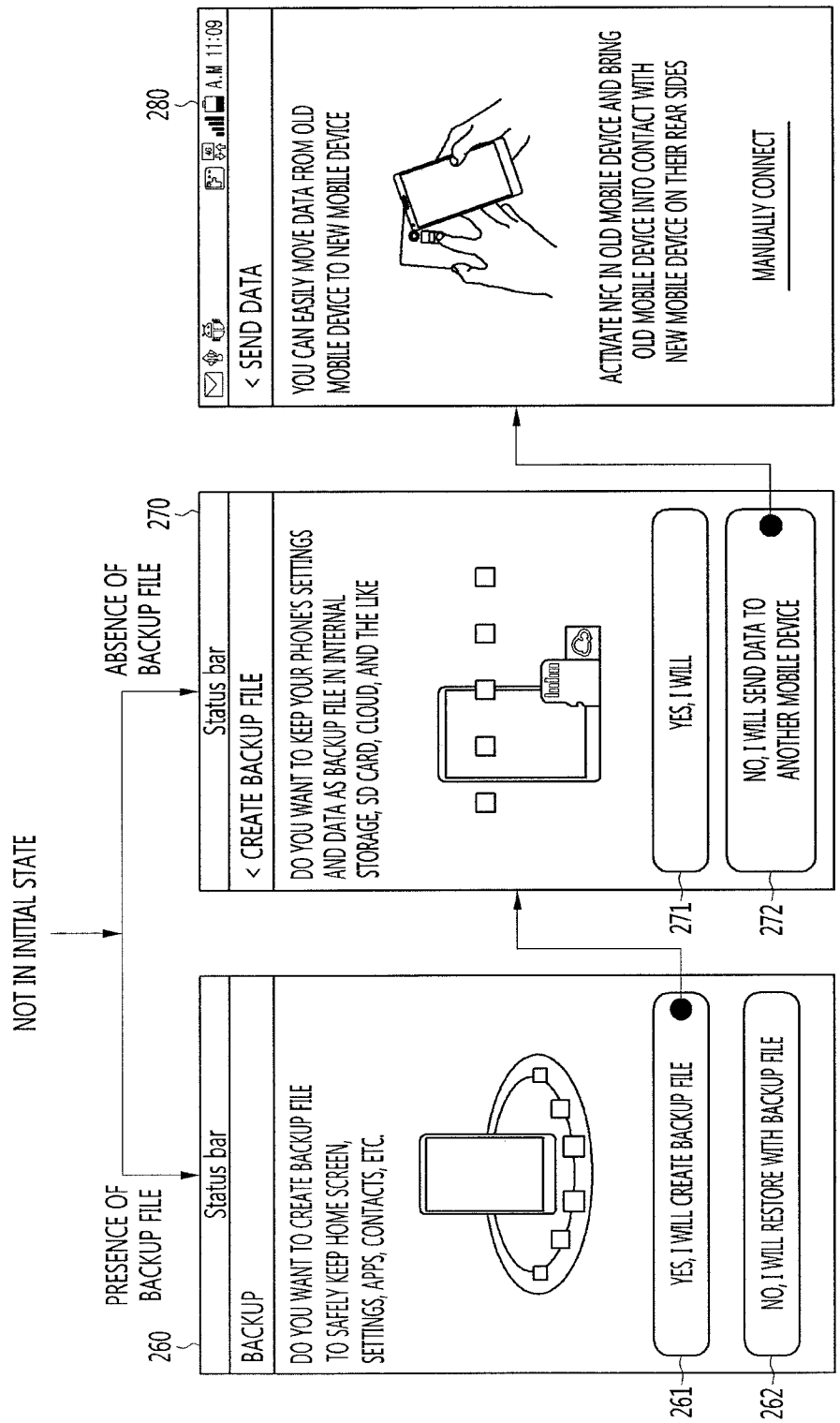

FIGS. 4A and 4B are views illustrating an operation in which a mobile terminal displays different backup-related function screens on the basis of the state of the mobile terminal and whether a backup file is present.

Referring to FIG. 4A, when the state of the mobile terminal 100 corresponds to an initial state and a backup file is stored in the memory 170 of the mobile terminal 100, the controller 180 may display a first screen 240 for checking whether to restore data in the mobile terminal 100 using the stored backup file. The first screen 240 may include a first item 241 for selecting a restoration operation using the stored backup file and a second item 242 for selecting an operation of receiving a backup file from another mobile terminal. The types of items included in the first screen 240 may be variously modified depending on the embodiment.

When the first item 241 is selected, the controller 180 may restore data in the mobile terminal 100 by using the backup file stored in the memory 170. On the other hand, when the second item 242 is selected, the controller 180 may display a second screen 250 for making a request to connect the mobile terminal 100 to another mobile terminal in order to receive a backup file from the other mobile terminal.

Also, when the mobile terminal 100 is in an initial state and a backup file is not stored in the memory 170 of the mobile terminal 100, the controller 180 may directly display the second screen for making a request to connect the mobile terminal 100 to another mobile terminal in order to receive a backup file from the other mobile terminal. This is because, for example, when a user purchases a new mobile terminal, which is a mobile terminal 100, it is common to restore data of an old mobile terminal in the mobile terminal 100.

The mobile terminal 100 or the backup application according to an embodiment of the present invention may use NFC (near field communication) tagging and Wi-Fi Direct in order to easily and conveniently connect to another mobile terminal and receive a backup file from the other mobile terminal. In this case, the second screen 250 may be a screen for making a request to perform NFC tagging between the mobile terminal 100 and the other mobile terminal.

Referring to FIG. 4B, when the mobile terminal 100 is not in an initial state and a backup file is stored in the mobile terminal 100, the controller 180 may display a third screen 260 for checking whether to generate a new backup file or to restore data using the stored backup file. The third screen 260 may include a first item 261 for selecting an operation of generating a new backup file and a second item 262 for selecting a restoration operation using the stored backup file.

When the first item 261 is selected, the controller 180 may display a fourth screen 270 for checking whether to store the backup file to be generated in the memory 170 or to transmit the backup file to another mobile terminal. On the other hand, when the second item 262 is selected, the controller 180 may perform a restoration operation using the backup file stored in the memory 170.

Also, when the mobile terminal 100 is not in an initial state and a backup file is not stored in the mobile terminal 100, the controller 10 may generate a backup file and display a fourth screen 270 for checking whether to store the backup file to be generated in the memory 170 or to transmit the backup file to another mobile terminal. This is because, for example, when the mobile terminal 100 is not in the initial state and a backup file is not present in the mobile terminal 100, it is common to back up data of the mobile terminal 100 through a backup application.

The fourth screen 270 may include a first item 271 for selecting an operation of storing the backup file to be generated in the memory 170 and a second item 272 for selecting an operation of transmitting the backup file to be generated to another mobile terminal. When the first item 271 is selected, the controller 180 may generate a backup file and store the generated backup file in the memory 170. When the second item 272 is selected, the controller 180 may display a backup file and may display a fifth screen 280 for making a request to connect the mobile terminal 100 to another mobile terminal in order to transmit the generated backup file to the other mobile terminal. The fifth screen 280 is similar to the second screen 250 shown in FIG. 4A, and thus a description thereof will be omitted.

According to an embodiment shown in FIGS. 4A and 4B, on the basis of the state of the mobile terminal 100 and whether a backup file is present, the mobile terminal 100 or the backup application may conveniently provide a function generally performed in each case. That is, it is possible to avoid the inconvenience that a user should experience through a procedure with several steps in order to perform the function.

The description of FIG. 2 will be resumed.

The mobile terminal 100 may perform any one of the backup-related and restoration-related functions on the basis of the screen displayed depending on the state of the mobile terminal 100 and whether a backup file is present (S130). Related to step S130, various embodiments regarding connection, backup, and restoration functions performed between mobile terminals will be described with reference to FIGS. 5 to 19C.

Figure 5:
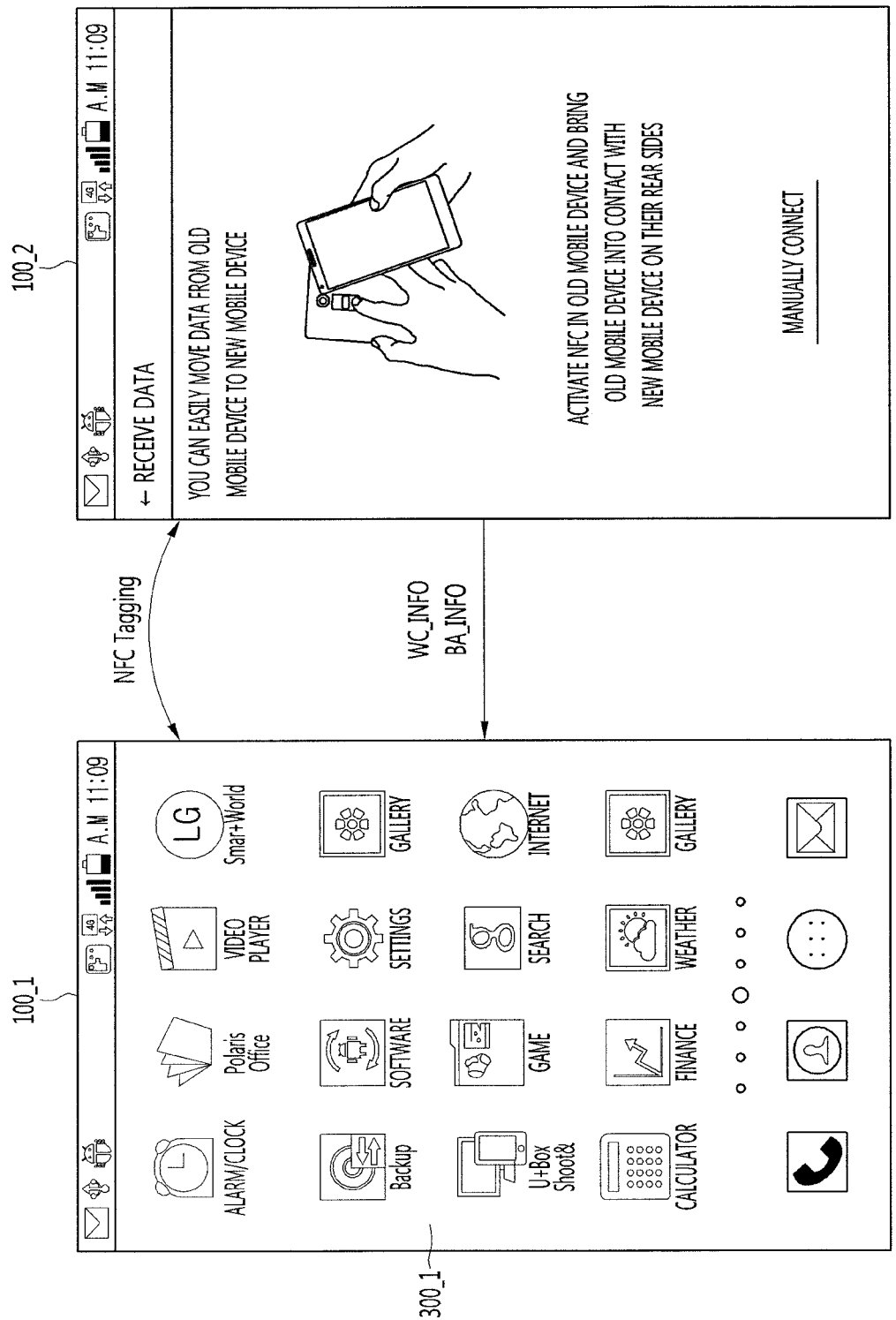
FIG. 5 is a diagram showing an operation in which a first mobile terminal and a second mobile terminal are connected to each other in order to restore data of the first mobile terminal in the second mobile terminal.

FIG. 5 is a view showing an operation in which a first mobile terminal and a second mobile terminal are connected to each other in order to restore data of the first mobile terminal in the second mobile terminal.

In this specification, a first mobile terminal 100_1 may refer to a mobile terminal that transmits a backup file or backup data to a second mobile terminal 100_2, and a second mobile terminal 100_2 may refer to a mobile terminal that restores a backup file or backup data transmitted from a first mobile terminal 100_1. For example, when a user purchases a new mobile terminal, the first mobile terminal 100_1 may correspond to an old mobile terminal that was used by the user, and the second mobile terminal 100_2 may correspond to the new mobile terminal.

Referring to FIG. 5, a controller 180_2 of the second mobile terminal 100_2 may display a second screen 250 for making a request to perform NFC tagging with the first mobile terminal 100_1. When the second mobile terminal 100_2 is NFC-tagged with the first mobile terminal 100_1 on the basis of the second screen 250 displayed on the second mobile terminal 100_2, the controller 180_2 of the second mobile terminal 100_2 may transmit wireless connection information WC_INFO for connecting the second mobile terminal 100_2 and the first mobile terminal 100_1 in a wireless communication manner (e.g., Wi-Fi Direct) to the first mobile terminal 100_1.

For example, the connection manner between the second mobile terminal 100_2 and the first mobile terminal 100_1 is Wi-Fi Direct, the wireless connection information WC_INFO may include Wi-Fi access point (AP) information and a media access control (MAC) address. In some embodiments, the controller 180_2 of the second mobile terminal 100_2 may transmit backup application information BA_INFO running in the second mobile terminal 100_2 to the first mobile terminal 100_1. The backup application information BA_INFO may include version information for the backup application.

The first mobile terminal 100_1 and the second mobile terminal 100_2 may be connected to each other on the basis of the wireless connection information WC_INFO. That is, when the first mobile terminal 100_1 and the second mobile terminal 100_2 are connected for the purpose of data restoration, a user may conveniently connect the first mobile terminal 100_1 and the second mobile terminal 100_2 only by performing NFC tagging.

Figure 6:
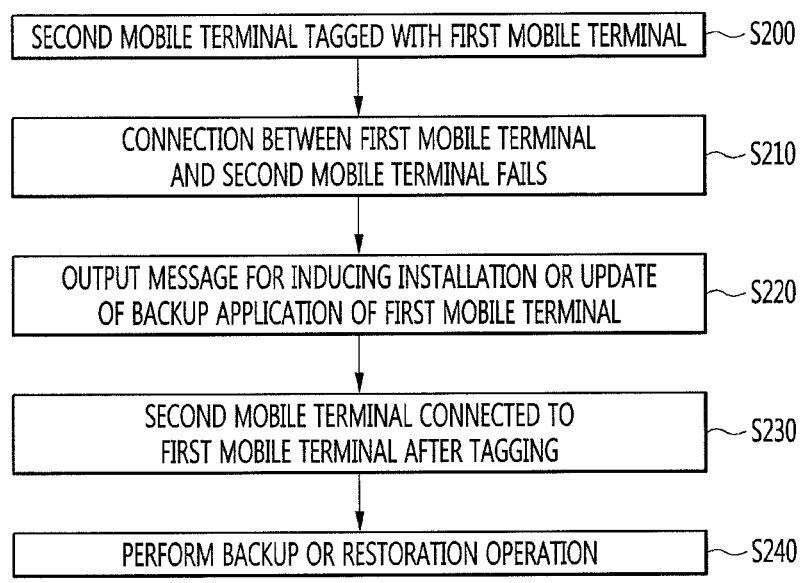
FIG. 6 is a flowchart illustrating an operation performed when the connection between the first mobile terminal and the second mobile terminal fails.

FIG. 6 is a flowchart illustrating an operation performed when a connection between a first mobile terminal and a second mobile terminal fails.

Referring to FIG. 6, the second mobile terminal 100_2 may be tagged in order to connect to the first mobile terminal 100_1 (S200). Step S200 has been described in detail with reference to FIG. 5, and thus description thereof will be omitted.

Although tagging is performed between the first mobile terminal 100_1 and the second mobile terminal 100_2, the connection between the first mobile terminal 100_1 and the second mobile terminal 100_2 may fail (S210). For example, when the version of a backup application installed in the first mobile terminal 100_1 is different from the version of a backup application installed in the second mobile terminal 100_2, or when no backup application is installed in the first mobile terminal 100_1, the connection failure may occur.

The second mobile terminal 100_2 may display a message for inducing installation of a backup application in the first mobile terminal 100_1 or for inducing update of a backup application installed in the first mobile terminal 100_1 (S220).

Steps S210 and S220 will be described in detail with reference to FIGS. 7A and 7B.

Figure 7A:
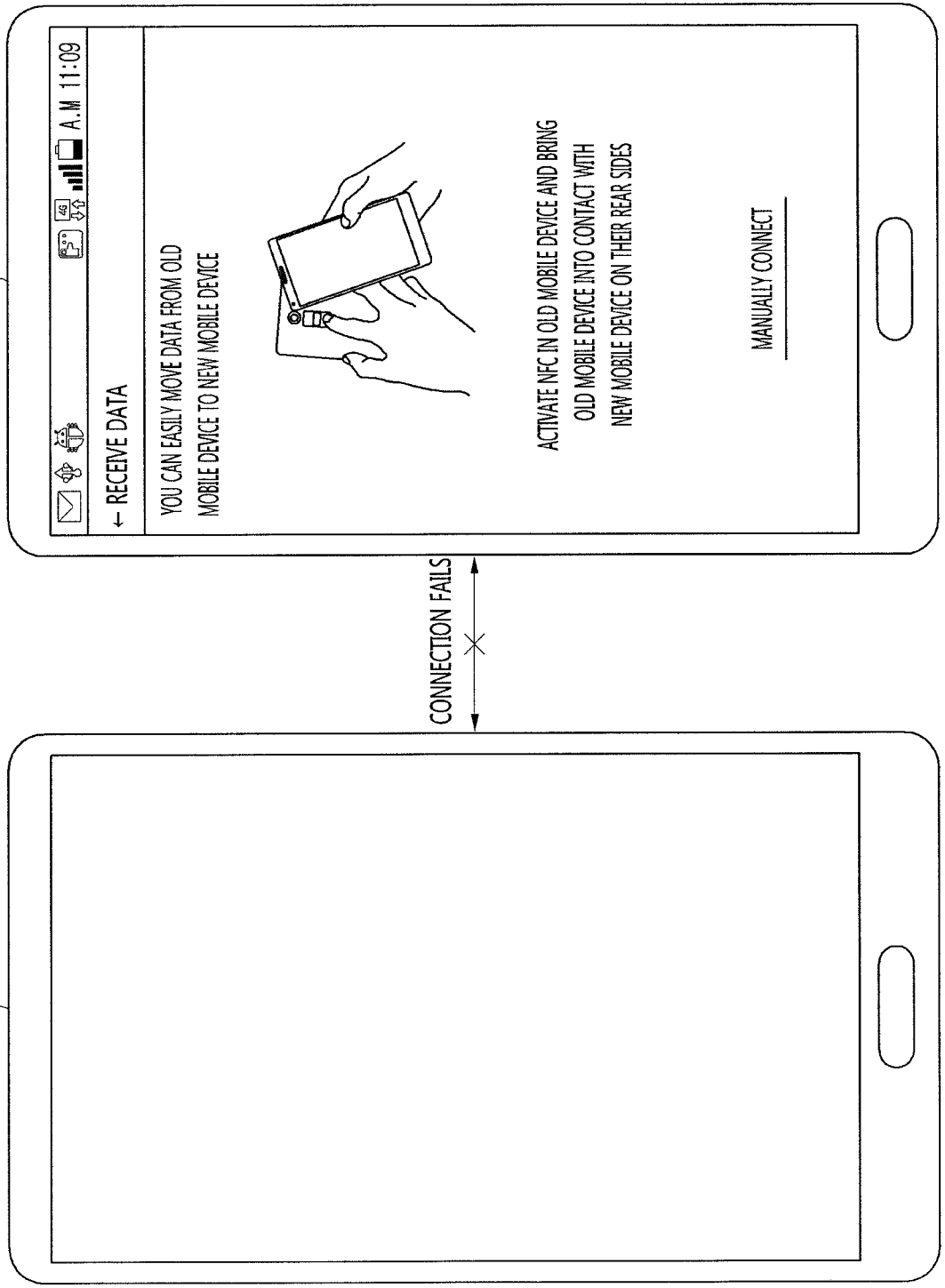
FIGS. 7A and 7B are views showing an example of a message displayed by the second mobile terminal when the connection between the first mobile terminal and the second mobile fails.
Figure 7B:
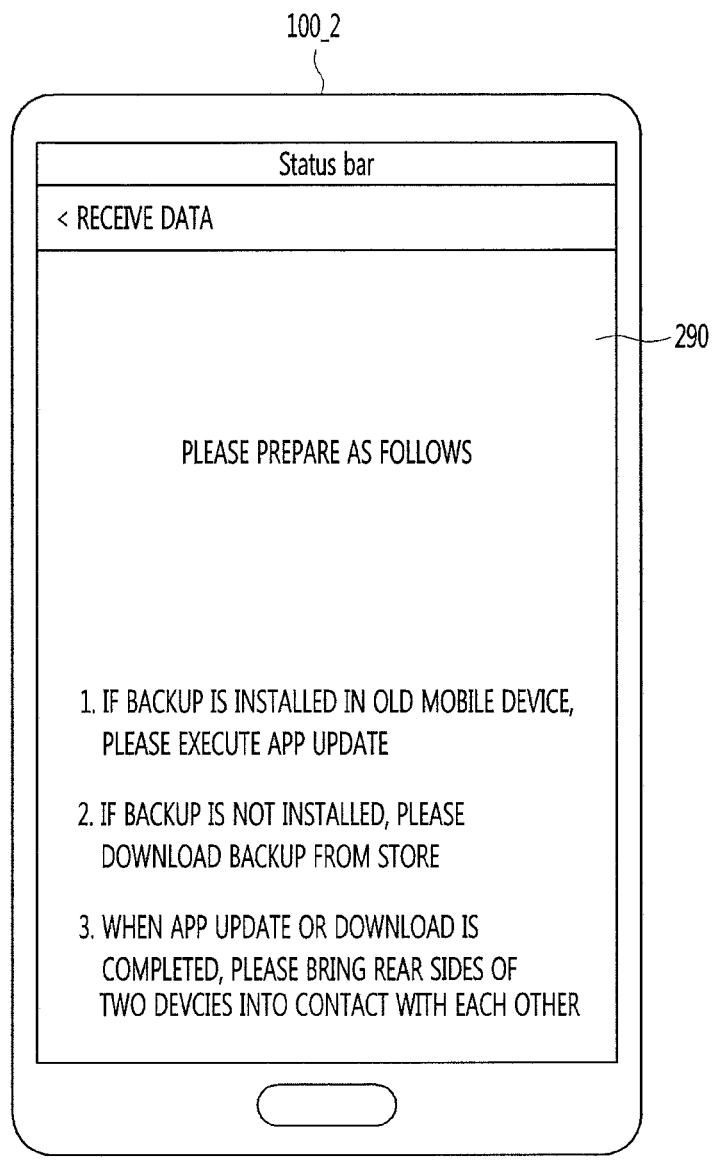

FIGS. 7A and 7B are views showing an example of a message displayed by the second mobile terminal when the connection between the first mobile terminal and the second mobile fails.

Referring to FIG. 7A, as described with reference to FIG. 4A, the controller 180_2 of the second mobile terminal 100_2 may display a screen 250 for making a request to connect to the first mobile terminal 100_1 (an NFC tagging request) in order to receive backup data from the first mobile terminal 100_1. Although tagging is performed between the first mobile terminal 100_1 and the second mobile terminal 100_2, the connection between the first mobile terminal 100_1 and the second mobile terminal 100_2 may be achieved.

For example, when the version of a backup application installed in the first mobile terminal 100_1 is different from the version of a backup application installed in the second mobile terminal 100_2 or when no backup application is installed in the first mobile terminal 1001, the connection between the first mobile terminal 100_1 and the second mobile terminal 100_2 may be achieved.

Referring to FIG. 7B, when the connection is not achieved, the controller 180_2 of the second mobile terminal 100_2 may display a screen 290 including a message for inducing installation of a backup application in the first mobile terminal 100_1 or for inducing update of a backup application installed in the first mobile terminal 100_1. Depending on the embodiment, the controller 180_1 of the first mobile terminal 100_1 may display a screen including the message on a display unit 151_1 of the first mobile terminal 100_1.

The description of FIG. 6 will be resumed.

After the backup application is installed in the first mobile terminal 100_1 or the update of the backup application is performed in the first mobile terminal 100_1 on the basis of the message displayed according to the embodiment shown in FIG. 7B and step S220, the first mobile terminal 100_1 and the second mobile terminal 100_2 may be tagged again and then connected to each other (S230). As the first mobile terminal 1001 and the second mobile terminal 100_2 are connected to each other, a backup or restoration operation may be performed (S240).

Embodiments in which data of the first mobile terminal 100_1 is restored in the second mobile terminal 100_2 will be described below with reference to FIGS. 8A to 13.

FIGS. 8A and 8B are views showing an embodiment of an operation of restoring data of the first mobile terminal in the second mobile terminal.

Referring to FIG. 8A, a home screen 300_1 (or an application list screen) of the first mobile terminal 100_1 may include a plurality of application icons 310. Each of the plurality of application icons 310 may correspond to any one application installed in the first mobile terminal 100_1.

On the other hand, when a home screen 300_2 (or an application list screen) of the second mobile terminal 100_2 connected to the first mobile terminal 100_1 may not include any application icon or may include only an application icon corresponding to a default application.

Referring to FIG. 8B, the controller 180_1 of the first mobile terminal 100_1 may receive a transmission request for at least some application icons 311_1 among application icons displayed on the home screen 300_1 and may transmit application backup data APP_DATA corresponding to the at least some application icons 311_1 or a backup file including the application backup data APP_DATA in response to the received request. The transmission request may be implemented in the form of an input (e.g., a touch input) for selecting at least some application icons 311_1 among the application icons displayed on the home screen 300_1.

The application backup data APP_DATA may include various kinds of application-related data such as installation data for an application, application-internal data generated and stored in association with an application, and the like.

Whenever each of the application icons is selected, the controller 180_1 may transmit an application backup data corresponding to the selected icon in real time. When a plurality of application icons are selected, the controller 180_1 may collectively transmit backup data of applications corresponding to the selected icons.

The controller 180_2 of the second mobile terminal 100_2 may perform a restoration operation using the application backup data APP_DATA received from the first mobile terminal 100_1. For example, the controller 180_2 may perform the restoration operation by installing an application using installation data included in the application backup data APP_DATA and storing application-internal data in the memory 170_2.

Depending on the embodiment, when the application backup data APP_DATA does not include installation data, the controller 180_2 may download and install an application corresponding to the application backup data APP_DATA from a server (not shown) that provides an application download service.

As a result of performing the restoration operation, a plurality of application icons 311_2 corresponding to the restored application may be displayed on the home screen 3002 of the second mobile terminal 100_2.

That is, according to the embodiment shown in FIGS. 8A and 8B, through an operation of selecting at least some icons 311_1 among the application icons 310 displayed on the home screen 300_1 of the first mobile terminal 100_1, it is possible for a user to easily restore the applications corresponding to the selected application icons in the second mobile terminal 100_2.

Although not shown, depending on the embodiment, the second mobile terminal 100_2 may be tagged and then connected to the first mobile terminal 100_1 while a specific application is running on the first mobile terminal 100_1. In this case, data of the specific application running on the first mobile terminal 100_1 may be transmitted to, and then restored in, the second mobile terminal 100_2.

Figure 9A:
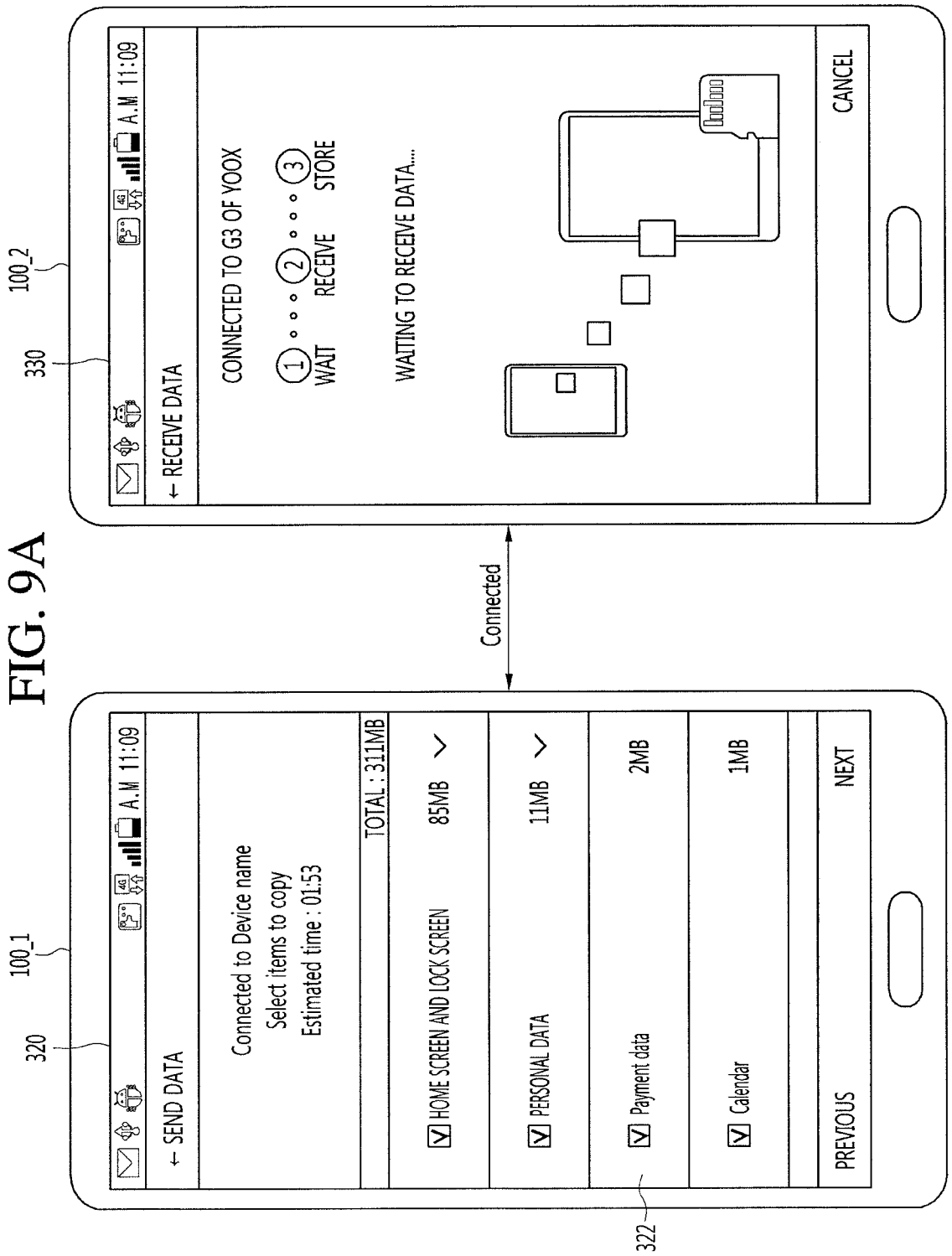
FIGS. 9A and 9B are views showing another embodiment of an operation of restoring data of the first mobile terminal in the second mobile terminal.
Figure 9B:
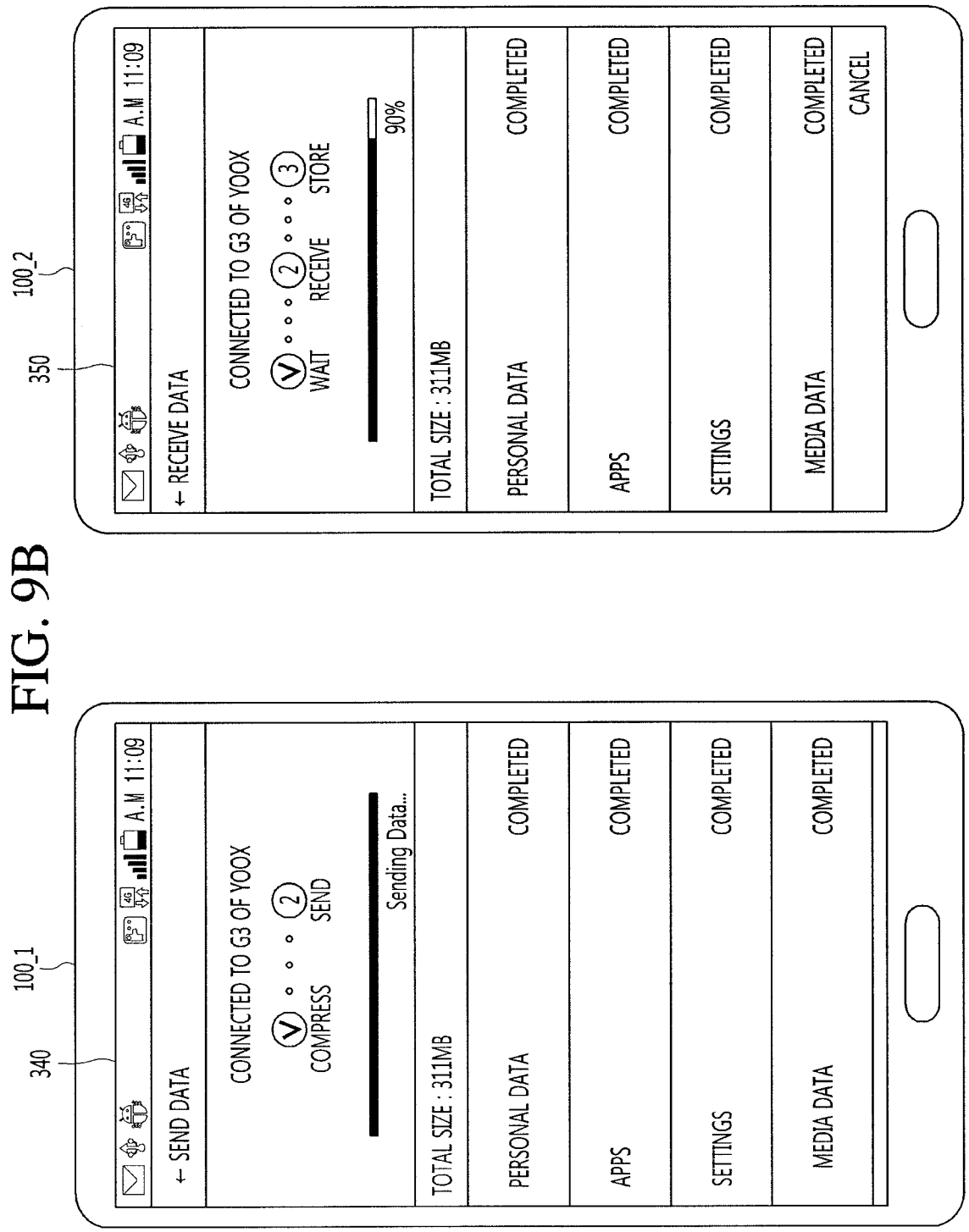

FIGS. 9A and 9B are views showing another embodiment of an operation of restoring data of the first mobile terminal in the second mobile terminal.

Referring to FIG. 9A, the controller 180_1 of the first mobile terminal 100_1 may display a data selection screen 320 for selecting backup data to be transmitted to the second mobile terminal 100_2. The data selection screen 320 may be automatically displayed when the first mobile terminal 100_1 and the second mobile terminal 100_2 are connected according to the embodiment shown in FIG. 5.

The data selection screen 320 may include a plurality of selection items for selecting backup data to be transmitted to, and restored in, the second mobile terminal 100_2. In particular, the data selection screen 320, which is provided by the backup application according to an embodiment of the present invention, may include an item for selecting whether to transmit and restore payment data (or payment information) needed to use a payment service through a payment application. The payment data may include various kinds of information needed for payment upon the purchase of a specific product or the use of a specific service, such as card information (a card number, a valid date, and the like), card owner information, and the like.

In order to use a payment service through the payment application, an authentication operation (e.g., fingerprint recognition, password input, or the like) should be performed on the payment data. Various embodiments associated with backup and restoration of the payment data will be described below with reference to FIGS. 14 to 21C.

Referring to FIG. 9B, the controller 180_1 of the first mobile terminal 100-1 may transmit backup data selected on the basis of the data selection screen 320 and may display a transmission screen 340 indicating a transmission progress of the backup data. The controller 180_2 of the second mobile terminal 100_2 may receive the backup data from the first mobile terminal 100_1 and may display a reception screen 350 indicating a reception progress.

Although not shown, after the controller 180_2 of the second mobile terminal 100_2 receives the backup data from the first mobile terminal 100_1, the controller 180_2 may restore the received backup data in the second mobile terminal 100_2.

Figure 10:
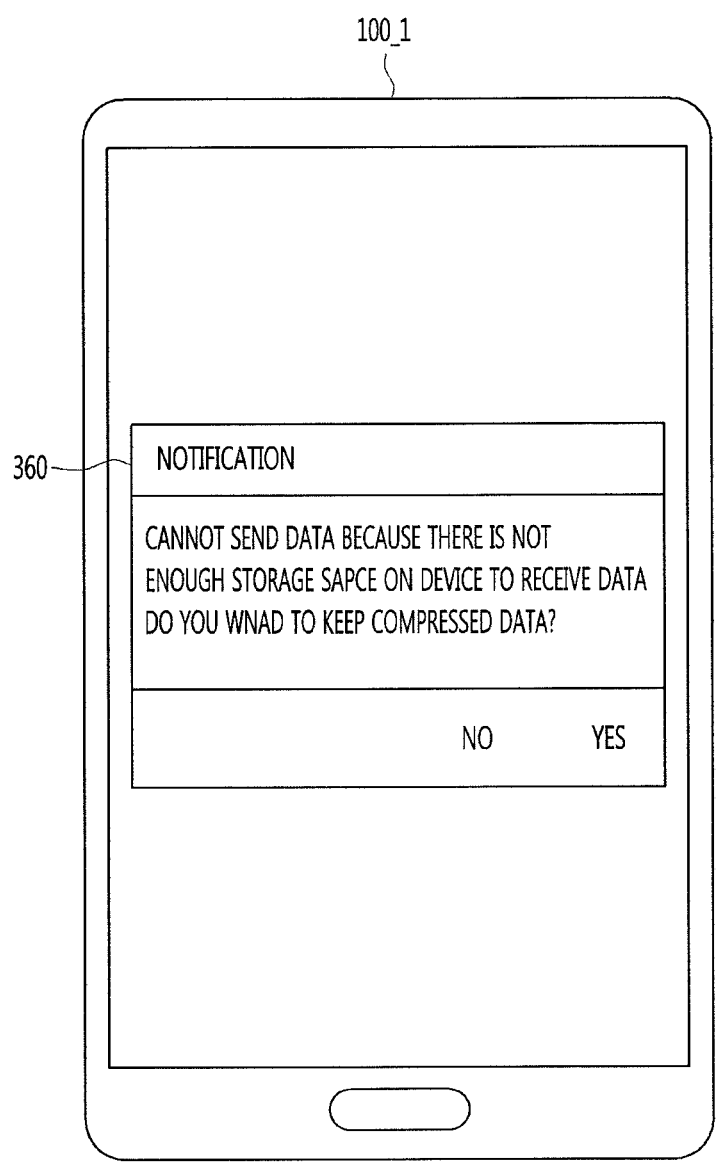
FIG. 10 is a view showing an example of a storage space shortage notification displayed in the first mobile terminal when the storage space of the second mobile terminal is insufficient.

FIG. 10 is a view showing an example of a storage space shortage notification displayed in the first mobile terminal when the storage space of the second mobile terminal is insufficient.

Referring to FIG. 10, when the capacity of the backup data to be received from the first mobile terminal 100_1 exceeds the remaining capacity of the memory 170_2, the controller 180_2 of the second mobile terminal 100_2 may inform the first mobile terminal 100_1 that the remaining capacity of the memory 170_2 is insufficient. For example, the controller 180_2 may transmit a signal or data indicating 1 that the remaining capacity is insufficient to the first mobile terminal 100_1.

The controller 180_1 of the first mobile terminal 100_1 may display a notification window 360 indicating that the remaining capacity of the second mobile terminal 1002 is insufficient. As shown in FIG. 10, the notification window 360 may be displayed in the form of a pop-up window, but is not limited thereto. When a storage request for backup data is received through the notification window 360, the controller 180_1 may store the backup data in the memory 170_1.

FIGS. 11A to 11D are views showing another embodiment of an operation of connecting the first mobile terminal and the second mobile terminal.

Figure 11A:
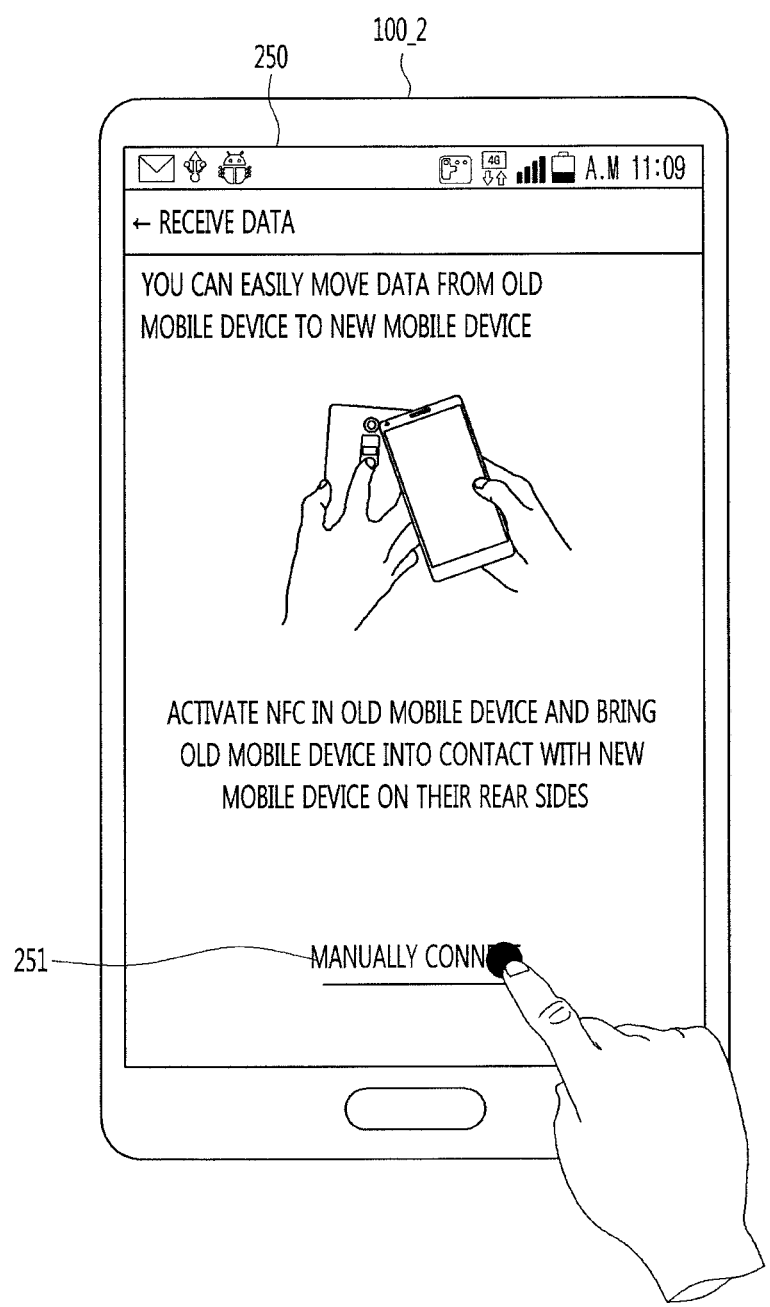
FIGS. 11A to 11O are views showing another embodiment of an operation of connecting the first mobile terminal and the second mobile terminal.

Referring to FIG. 11A, a screen 250 displayed on the second mobile terminal 100_2 may include a manual connection menu 251. For example, when an NFC communication module is not provided in the first mobile terminal 100_1 to be connected to the second mobile terminal 100_2, NFC tagging between the first mobile terminal 100_1 and the second mobile terminal 100_2 may not be possible. In this case, the controller 180_2 of the second mobile terminal 100_2 may perform an operation for connecting to the first mobile terminal 100_1 on the basis of a manual connection request received through the manual connection menu 251.

Figure 11B:
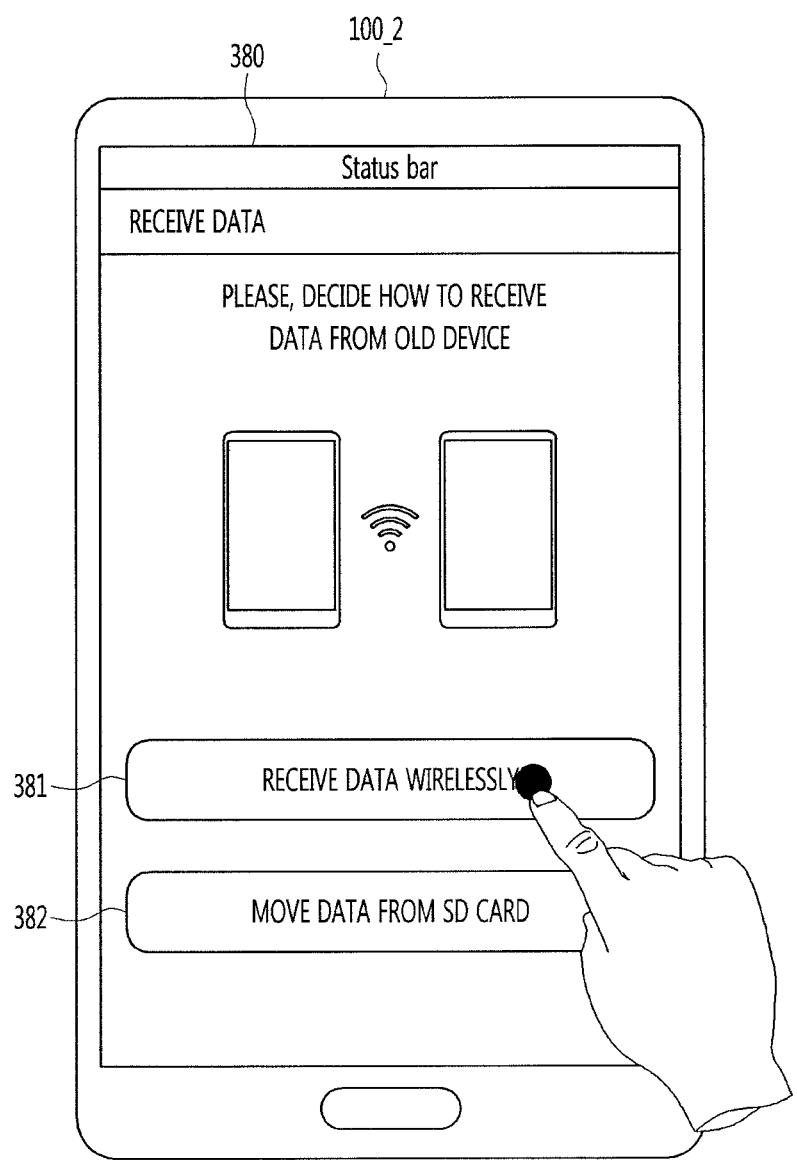

Referring to FIG. 11B, the controller 180_2 may display a data reception selection screen 380 for selecting any one of methods of receiving data from the first mobile terminal 100_1 on the basis of the manual connection request.

For example, the data reception methods may include a method of receiving data through wireless communication, a method of receiving data using an external apparatus (or an external module, e.g., an SD card) detachable from a mobile terminal, and the like. As an example of the data reception selection screen in FIG. 11B, the data reception selection screen 380 is shown as including a first item 381 for selecting a method of receiving data through wireless communication and a second item 382 for selecting a method of receiving data using an SD card. However, depending on the embodiment, the data reception selection screen may be variously modified.

Figure 11C:
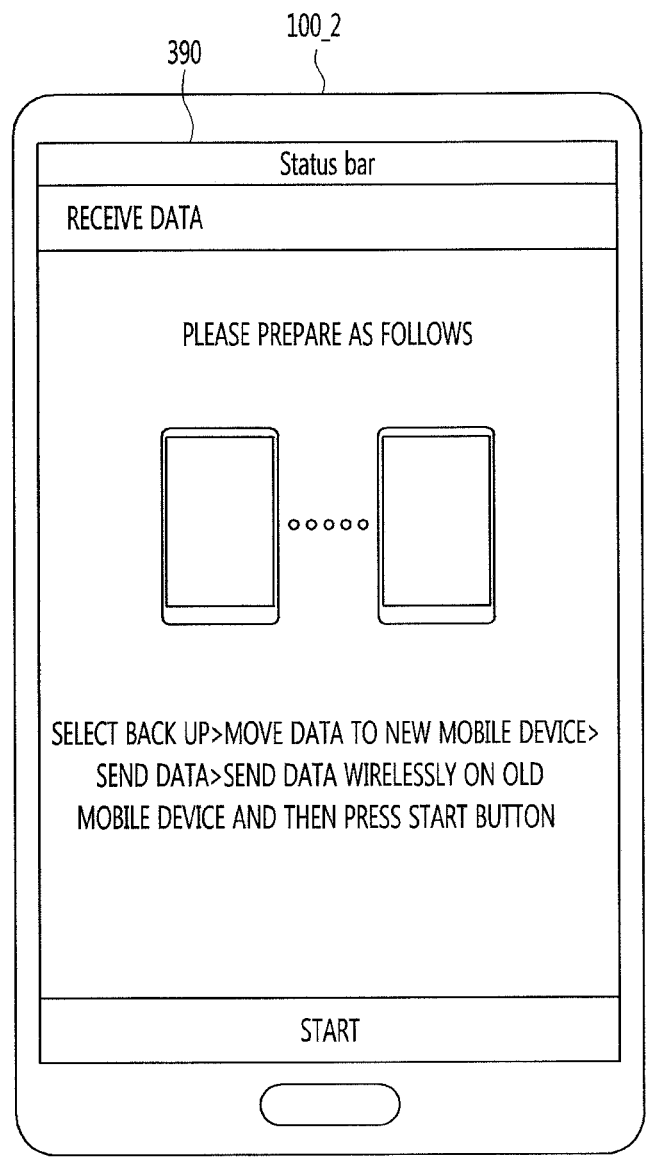
Figure 11D:
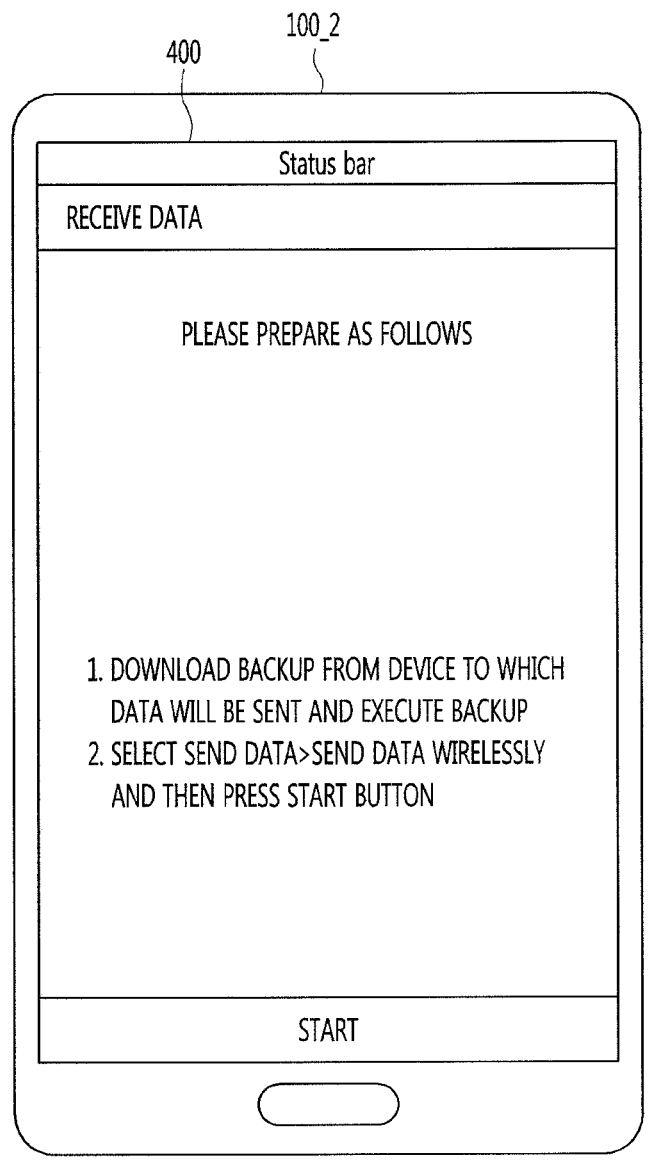

Referring to FIGS. 11B to 11D, the controller 180_2 may display a guide screen 390 or 400 for connecting to the first mobile terminal 100_1 in a wireless manner in response to a request to select the first item 381. When the first mobile terminal 100_1 and the second mobile terminal 100_2 are connected in a wireless manner on the basis of the guide screen 390 or 400, the second mobile terminal 100_2 may receive data from the first mobile terminal 100_1.

FIGS. 12A to 12D are views showing a data backup process of the first mobile terminal upon backup and restoration of data using an external apparatus.

Figure 12A:
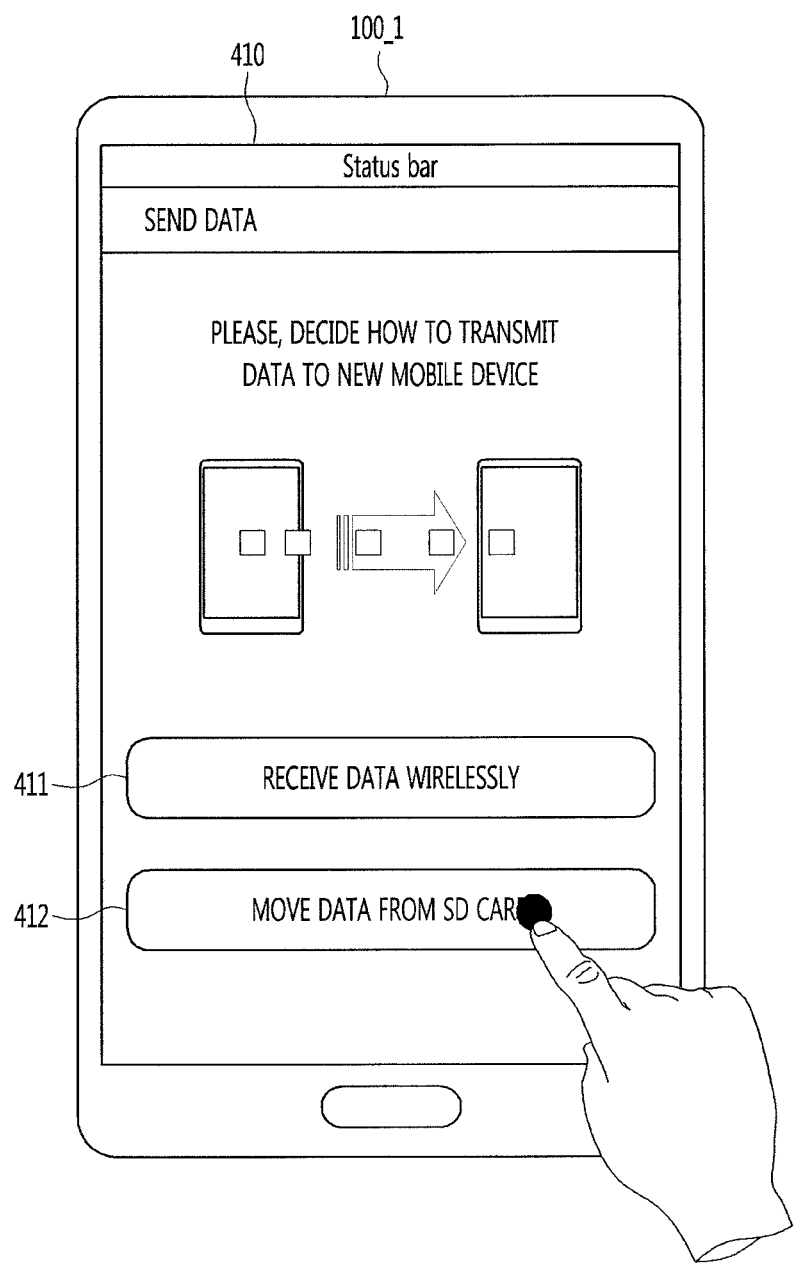
FIGS. 12A to 12D are views showing a data backup process of the first mobile terminal upon backup and restoration of data using an external apparatus.

Referring to FIG. 12A, the controller 180_1 of the first mobile terminal 100_1 may display a data transmission selection screen 410 for selecting any one of methods of transmitting data to the second mobile terminal 100_2. The data transmission methods may correspond to the data reception methods that are described above with reference to FIG. 11B.

The data transmission selection screen 410 may include a first item 411 for performing an operation of transmitting data through wireless communication and a second item 412 for performing an operation of transmitting data using an external apparatus (e.g., an SD card).

Figure 12B:
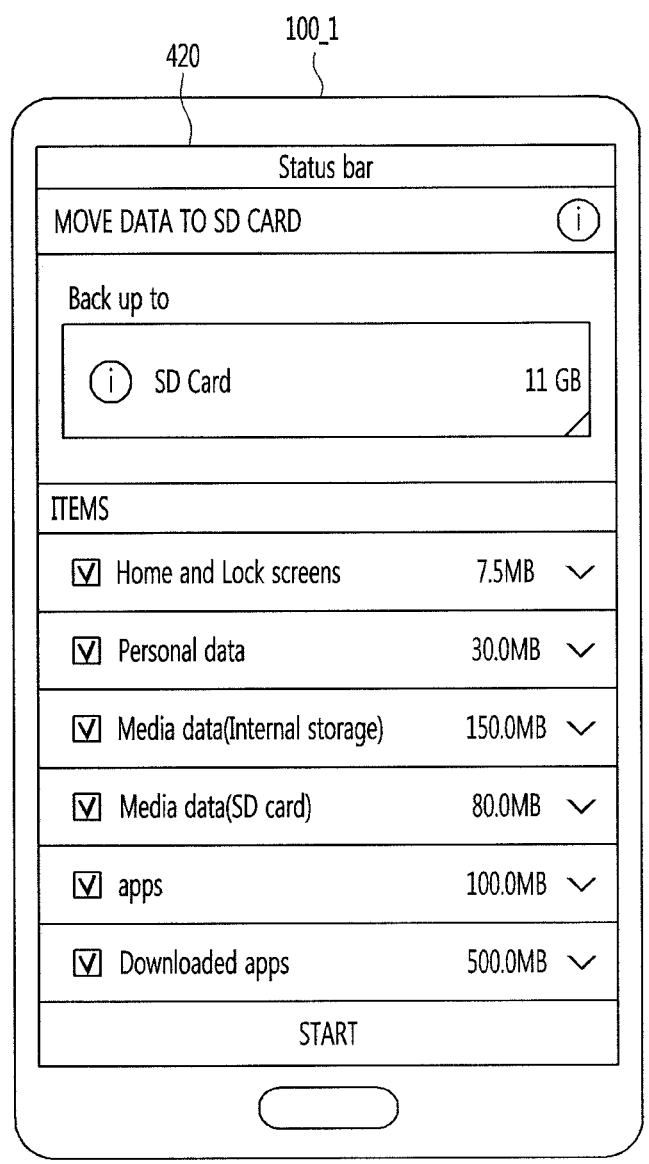
Figure 12C:
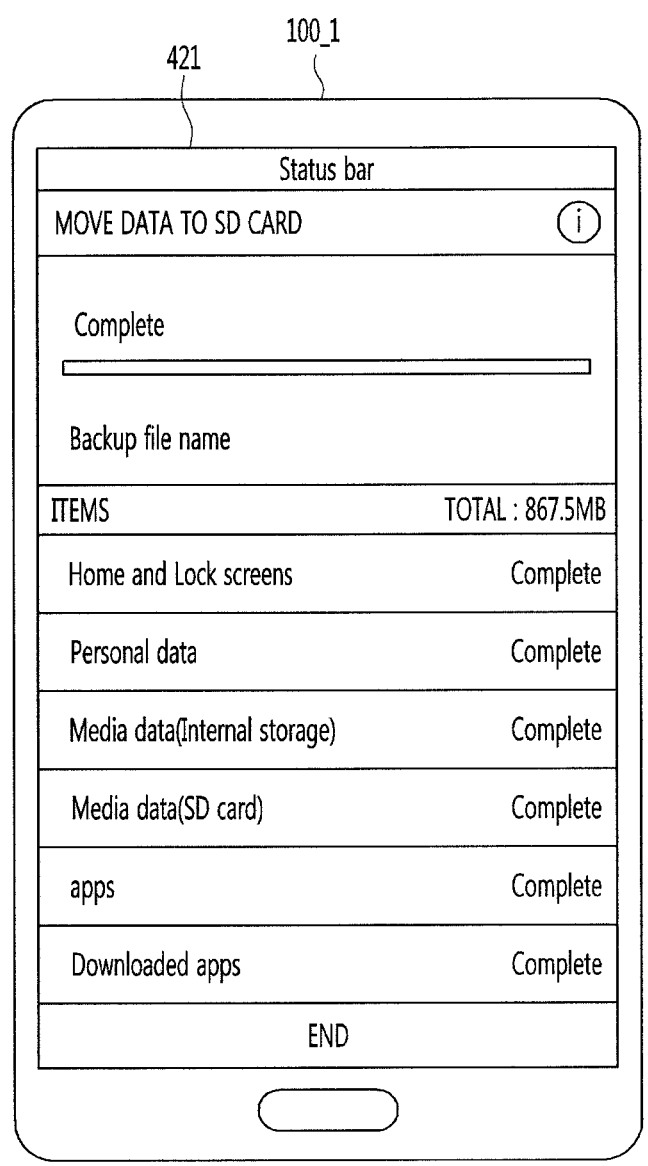
Figure 12D:

Referring to FIGS. 12B to 12D, the controller 180_1 may display a backup data selection screen 420 for selecting data to be back up in an SD card (not shown) installed in the first mobile terminal 100_1 in response to a request to select the second item 412. When data to be back up is selected on the basis of the backup data selection screen 420, the controller 180_1 may back up data by moving or copying the selected data to the SD card. When the data backup is completed, the controller 180_1 may display an external apparatus removal request screen 430 for removing the SD card from the first mobile terminal 100_1.

Figure 13A:
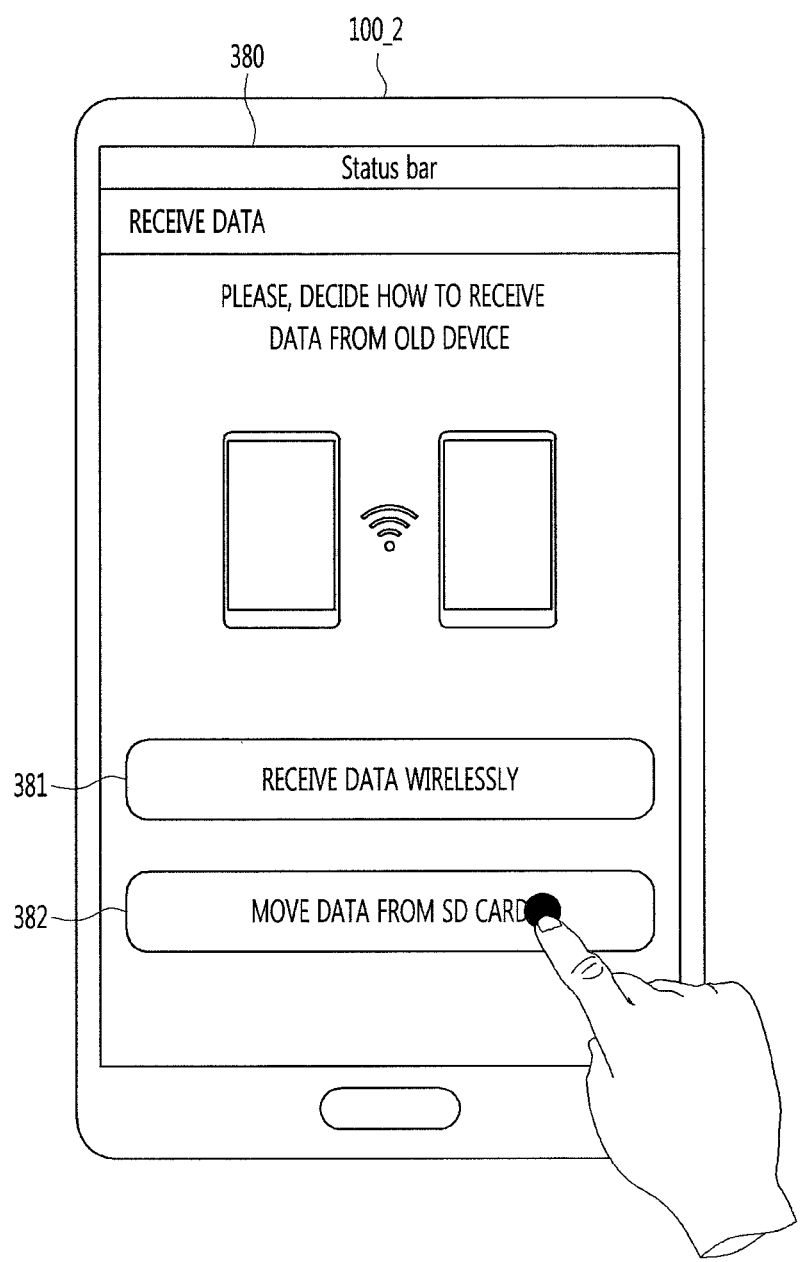
FIGS. 13A to 13C are views showing a data restoration process of the second mobile terminal upon backup and restoration of data using an external apparatus.
Figure 13B:
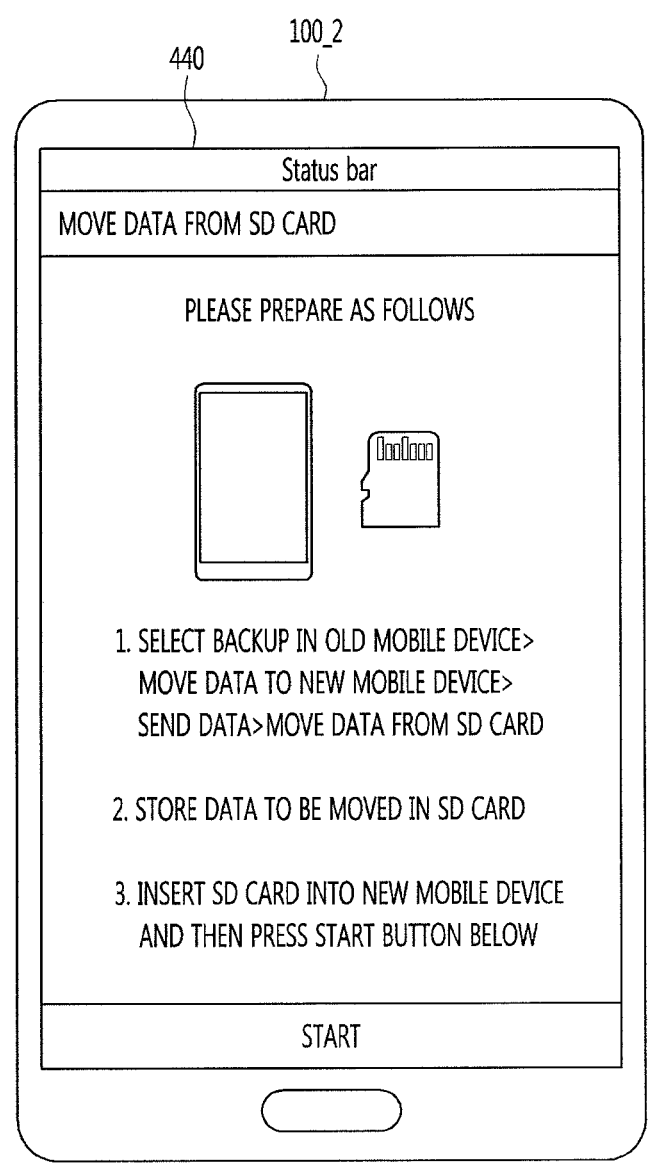
Figure 13C:
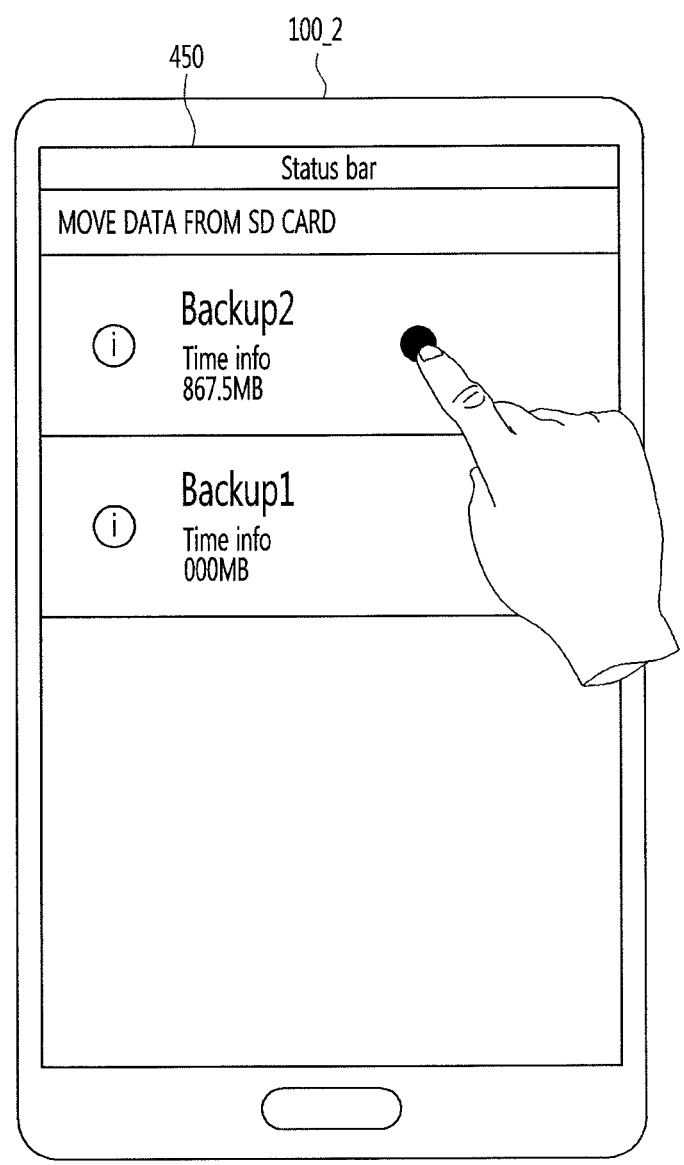

FIGS. 13A to 13C are views showing a data restoration process of the second mobile terminal upon backup and restoration of data using an external apparatus.

Referring to FIGS. 13A to 13C, the controller 180_2 may receive a request for selecting a second item 382 among items 381 and 382 included in the data reception selection screen 380 as described above with reference to FIG. 11B. The controller 180_2 may display an external-apparatus installation request screen 400 for making a request to install an external apparatus (e.g., an SD card) in which data to be restored is stored in the second mobile terminal 100_2 in response to the received request.

When an SD card in which data to be restored is stored is installed in the second mobile terminal 100_2, the controller 180_2 may restore the data stored in the SD card in the second mobile terminal 100_2. Depending on the embodiment, as shown in FIG. 13C, when a plurality of pieces of backup data are stored in the SD card, the controller 180_2 may display a restoration data selection screen 450 for selecting any one piece to be restored among the plurality of pieces of backup data. When any one piece is selected among the plurality of pieces of backup data included in the restoration data selection screen 450, the controller 180_2 may restore the selected backup data in the second mobile terminal 100_2.

Figure 14:
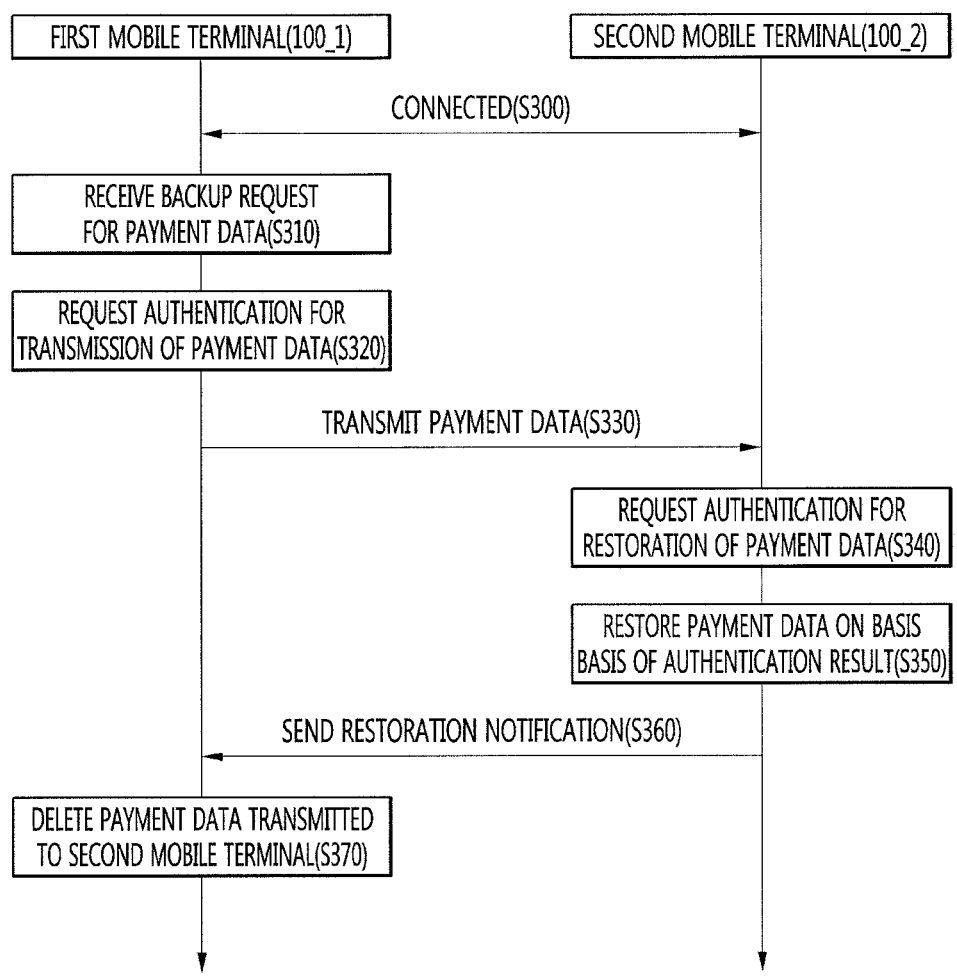
FIG. 14 is a ladder diagram illustrating an embodiment of an operation of restoring, in the second mobile terminal, payment data stored in the first mobile terminal.

FIG. 14 is a ladder diagram illustrating an embodiment of an operation of restoring, in the second mobile terminal, payment data stored in the first mobile terminal.

Referring to FIG. 14, the first mobile terminal 100_1 and the second mobile terminal 100_2 may be connected to each other through wireless communication (e.g., Wi-Fi Direct) (S300). An operation of the connection between the first mobile terminal 100_1 and the second mobile terminal 100_2 has been described above with reference to FIG. 5, and thus a description thereof will be omitted.

The first mobile terminal 100_1 may receive a backup request for payment data (S310).

The payment data may include various kinds of information needed for payment upon the purchase of a specific product or the use of a specific service, such as card information (a card number, a valid date, and the like), card owner information, and the like, as shown in FIG. 9A.

The first mobile terminal 100_1 may perform an authentication operation for transmitting the payment data in response to the backup request (S320). In order to prevent the payment data from being transmitted to and restored in another mobile terminal by a third party other than the user of the first mobile terminal 100_1, the controller 180_1 of the first mobile terminal 100_1 may perform authentication for transmitting the payment data. For example, the authentication may include authentication using fingerprint recognition, authentication using password input, or the like. Depending on the embodiment, the controller 180_1 may encrypt the payment data by performing the authentication.

When the authentication according to step S320 is completed, the first mobile terminal 100_1 may transmit the payment data to the second mobile terminal 100_2 (S330), and the second mobile terminal 100_2 may request authentication for restoring the payment data received from the first mobile terminal 100_1 (S340). In order to prevent the payment from being restored in another mobile terminal by a third party, the controller 180_2 may request authentication for restoring the payment data.

When the authentication according to step S340 is completed, the second mobile terminal 100_2 may restore the payment in the second mobile terminal 100_2 (S350). When the restoration is completed, the second mobile terminal 100_2 may transmit a restoration notification to the first mobile terminal 100_1 (S360).

The first mobile terminal 100_1 may delete the payment data transmitted to the second mobile terminal 100_2 in response to the received restoration notification (S370).

The embodiment shown in FIG. 14 will be described in detail with reference to FIGS. 15A to 19C.

Figure 15A:
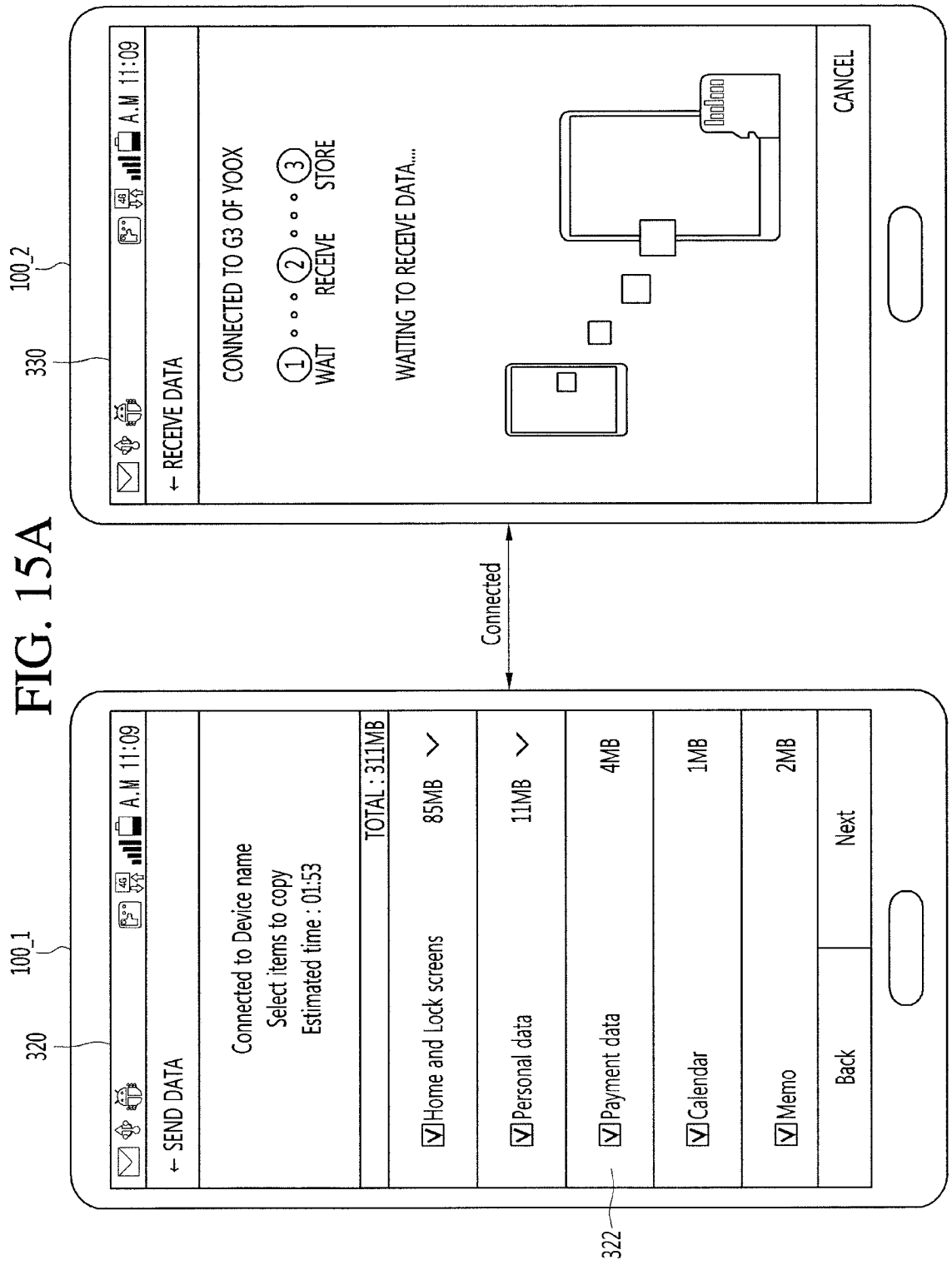
FIGS. 15A to 15C are views showing the embodiment shown in FIG. 14.
Figure 15B:
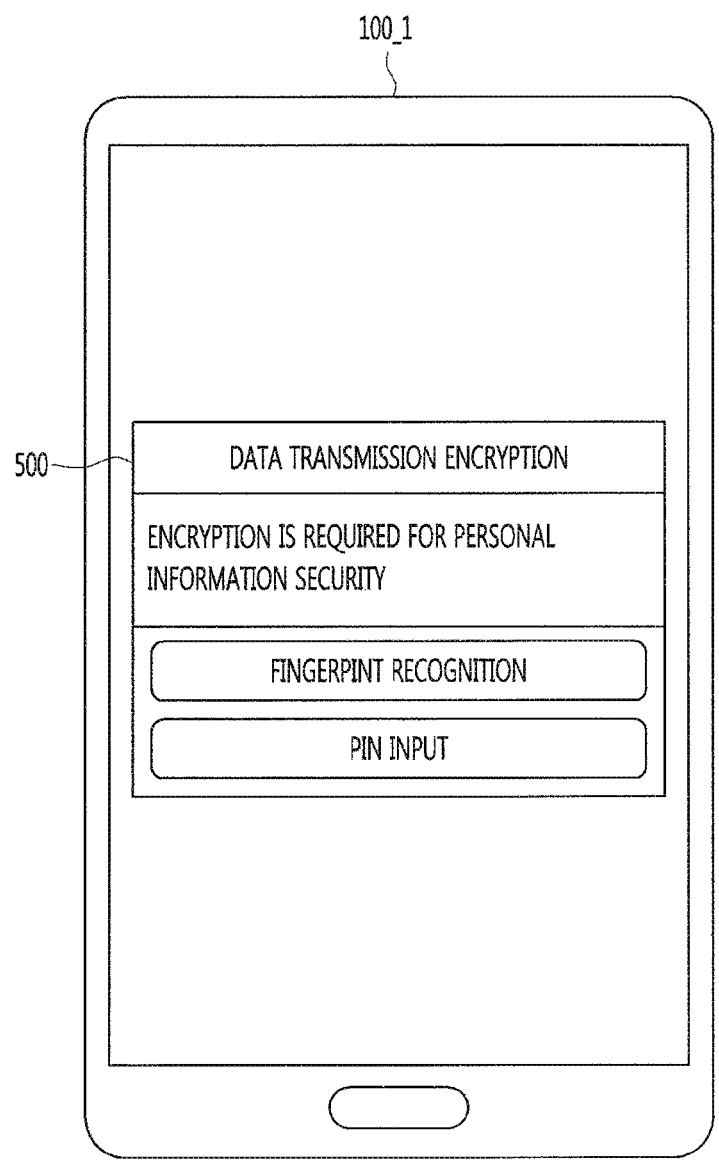
Figure 15C:
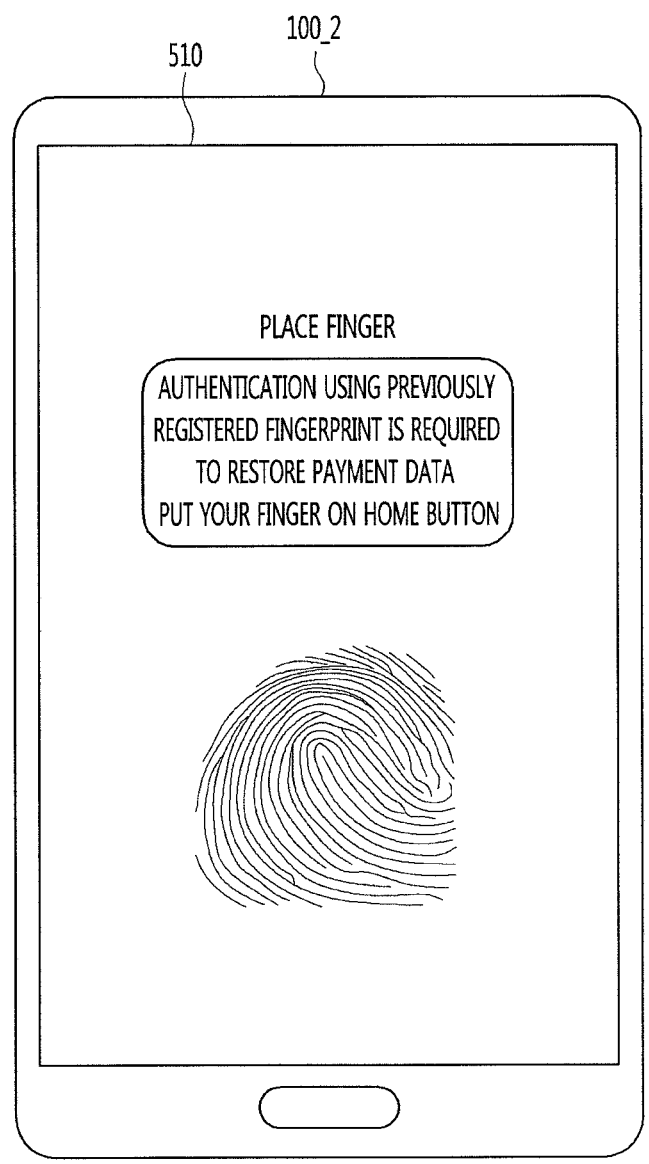

FIGS. 15A to 15C are views showing the embodiment shown in FIG. 14.

Referring to FIG. 15A, the controller 180_1 of the first mobile terminal 100_1 may display the data selection screen 320 that has been described with reference to FIG. 9A. The controller 180_1 may receive a data backup request on the basis of the data selection screen 320. By an operation of selecting an item 322 corresponding to the payment data among a plurality of selection items included in the data selection screen 320, the controller 180_1 may receive a backup request for the payment data.

Referring to FIG. 15B, the controller 180_1 may display an authentication request window 500 in order to perform authentication for encrypting and/or transmitting the payment data. On the basis of the authentication request window 500, the controller 180_1 may perform authentication through fingerprint recognition or may perform authentication through password input. The controller 180_1 may receive authentication information (a fingerprint, a password, etc.) and perform an authentication operation by using the received authentication information.

When the authentication is completed, the controller 180_1 may transmit the payment data or backup data including the payment data to the second mobile terminal 100_2. The backup data transmission operation is substantially the same as that of the embodiment shown in FIG. 9B, and thus a description thereof will be omitted.

Referring to FIG. 15C, the controller 180_2 of the second mobile terminal 100_2 may perform an authentication operation for restoring the payment data received from the first mobile terminal 100_1. The controller 180_2 may display an authentication request screen 510 and may perform an authentication operation using authentication information (e.g., a fingerprint) input on the basis of the displayed authentication request screen 510. When the authentication is completed, the controller 180_2 may restore the payment data in the second mobile terminal 100_2.

Depending on the embodiment, the authentication operation performed by the first mobile terminal 100_1 and the second mobile terminal 100_2 may be for performing authentication with a server that provides a payment service using the payment data. The server may store various kinds of information for providing a payment service using the payment data. For example, the information may include the payment data and terminal information (information regarding the first mobile terminal 100_1) registered with the payment data.

In this case, only the first mobile terminal 100_1 may use the payment data to receive the payment service. That is, even when the payment data stored in the first mobile terminal 100_1 is restored in the second mobile terminal 100_2, the second mobile terminal 100_2 may not receive the payment service using the payment data.

Accordingly, when the payment data of the first mobile terminal 100_1 is restored in the second mobile terminal 100_2, the second mobile terminal 100_2 may receive the payment service using the payment data through authentication with the server.

For example, upon the authentication operation of the first mobile terminal 100_1 shown in step S320 of FIG. 14, the first mobile terminal 100_1 may request the server to change the terminal information. Also, upon the authentication operation of the second mobile terminal 100_2 shown in step S340 of FIG. 14, the second mobile terminal 100_2 may request the server to register information regarding the second mobile terminal 100_2 as the terminal information with respect to the payment data.

The server may provide the payment service using the payment data to the second mobile terminal 100_2 by changing the terminal information to the information regarding the second mobile terminal 100_2 and registering the changed information.

That is, according to the embodiment, upon backup and restoration of the payment, it is possible to safely move the payment by the authentication operations of the first mobile terminal 100_1 and the second mobile terminal 100_2. Also, depending on the embodiment, even an authentication operation with an external server may be performed.

FIGS. 16A to 17B are views showing another embodiment of an operation of restoring, in the second mobile terminal, payment data stored in the first mobile terminal.

Figure 16A:
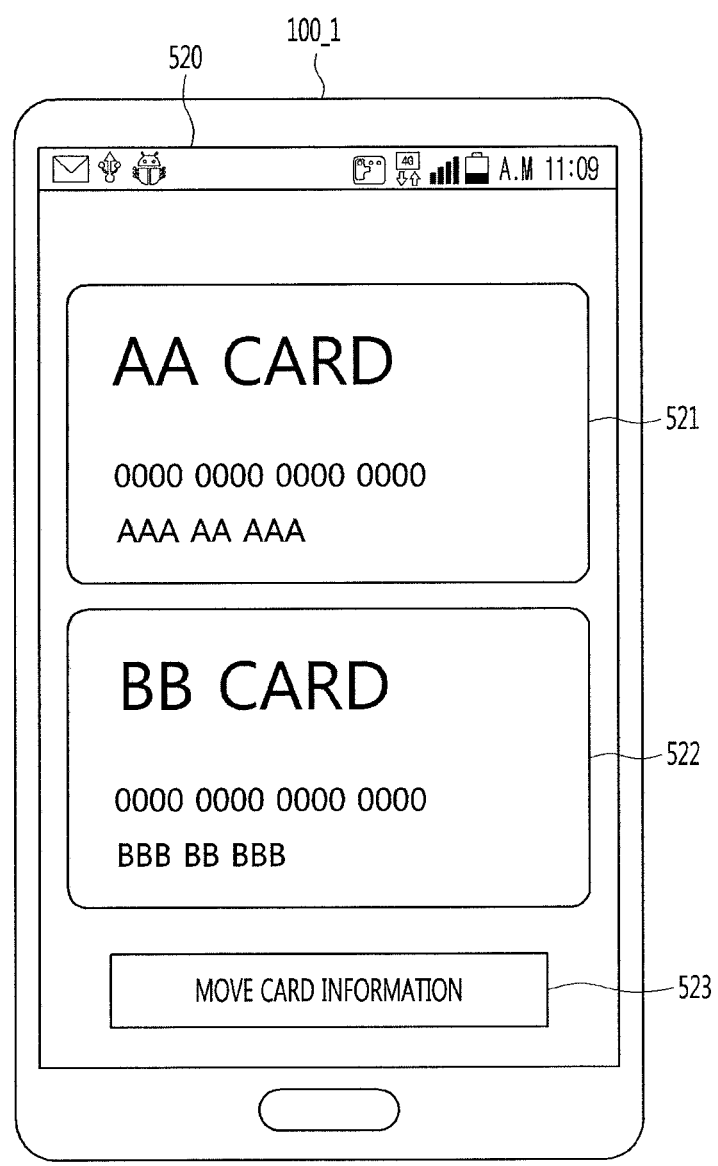

Referring to FIG. 16A, the controller 180_1 of the first mobile terminal 100_1 may display an execution screen 520 of a payment application in response to an execution request for the payment application. For example, the execution screen 520 may include at least one or more payment data images 521 and 522. The payment data images 521 and 522 may be images related to corresponding payment data.

Depending on the embodiment, the execution screen 520 may further include a menu item 523 for backing up and restoring the payment data in another mobile terminal. The menu item 523 may be displayed together with the payment data images 521 and 522 or may be displayed when the first mobile terminal is NFC-tagged with, and then wirelessly connected to, the second mobile terminal 100_2 while the payment application is executed.

Figure 16B:
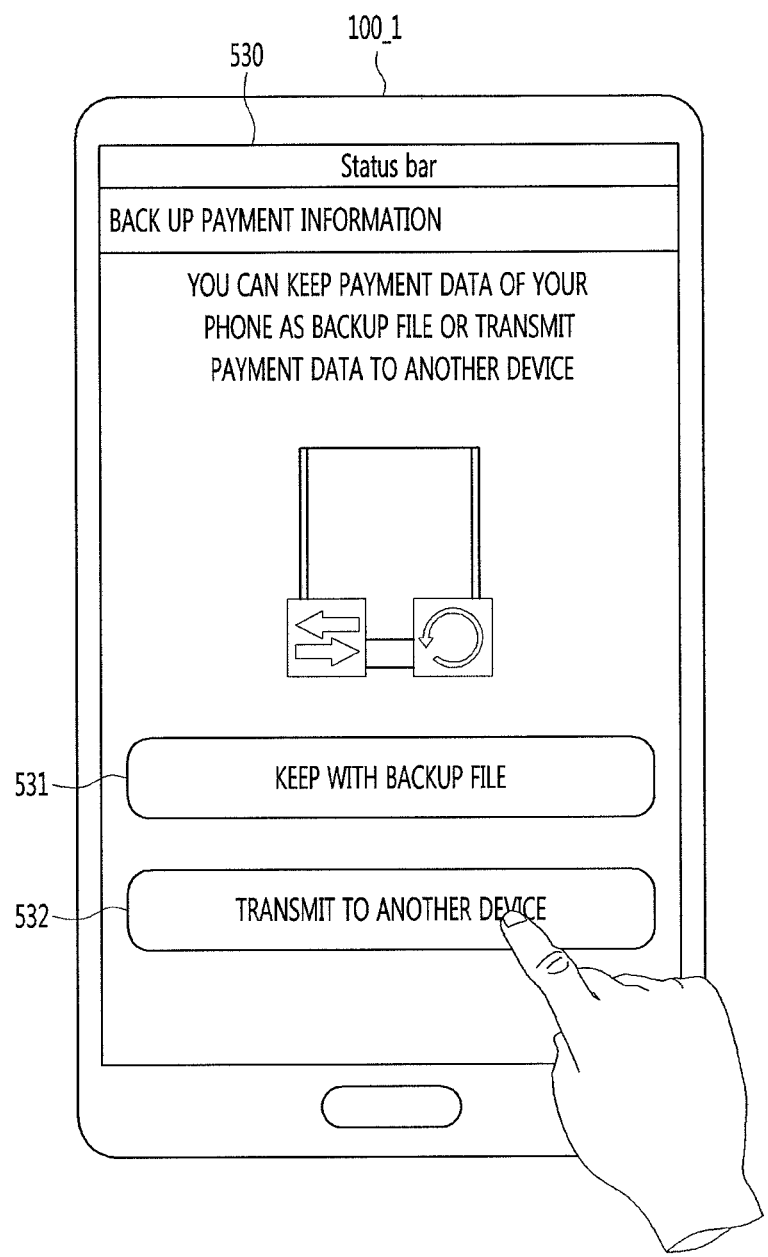

Referring to FIG. 16B, the controller 180_1 may display a payment data backup screen 530 in response to a selection request for the menu item 523. The payment data backup screen 530 may include a first item 531 for acquiring a request for keeping payment data as a backup file and a second item 532 for acquiring a request for transmitting payment data to another mobile terminal.

When the second item 532 is selected, the controller 180_1 may display the authentication request window 500 shown in FIG. 15B and may perform an authentication operation on the basis of the displayed authentication request window 500.

Referring to FIG. 16C, in order to transmit the payment data to the second mobile terminal 100_2 after the authentication operation is completed, the controller 180_1 may display a connection request screen 540 for inducing connection to the second mobile terminal 100_2. When the first mobile terminal 100_1 and the second mobile terminal 100_2 are connected, the controller 180_1 may transmit payment data P_DATA to the second mobile terminal 100_2.

Depending on the embodiment, when the first mobile terminal 100_1 and the second mobile terminal 100_2 have already been connected, the controller 180_1 may transmit the payment data P_DATA to the second mobile terminal 100_2 after the authentication operation is completed.

Referring to FIG. 17A, the controller 180_2 of the second mobile terminal 100_2 may display an authentication request screen 510 as described above with reference to FIG. 15C. The controller 180_2 may perform an authentication operation using authentication information input on that basis of the displayed authentication request screen 510 and may restore the payment data in the second mobile terminal 100_2.

As a result of the restoration, payment data images 541 and 542 may be included in an execution screen 540 for a payment application executed in the second mobile terminal 100_2. The controller 180_2 may transmit, to the first mobile terminal 100_1, a restoration notification indicating that the payment data has been normally restored.

Referring to FIG. 17B, the controller 180_1 of the first mobile terminal 100_1 may delete the payment data in response to the restoration notification received from the second mobile terminal 100_2. The controller 180_1 may display a message screen 550 indicating that the payment data is deleted and may delete the payment data images 521 and 522 included in the execution screen 520 for the payment application.

Figure 18A:
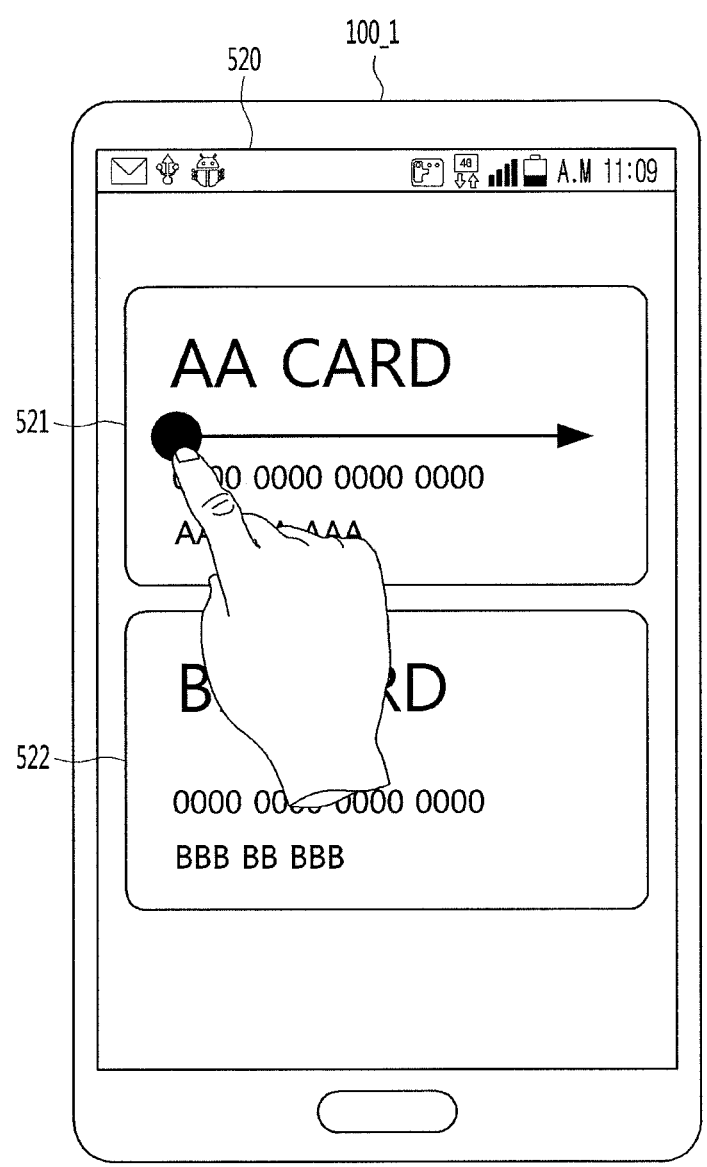
FIGS. 18A and 18B are views showing an example of a transmission request for payment data stored in the first mobile terminal.
Figure 18B:
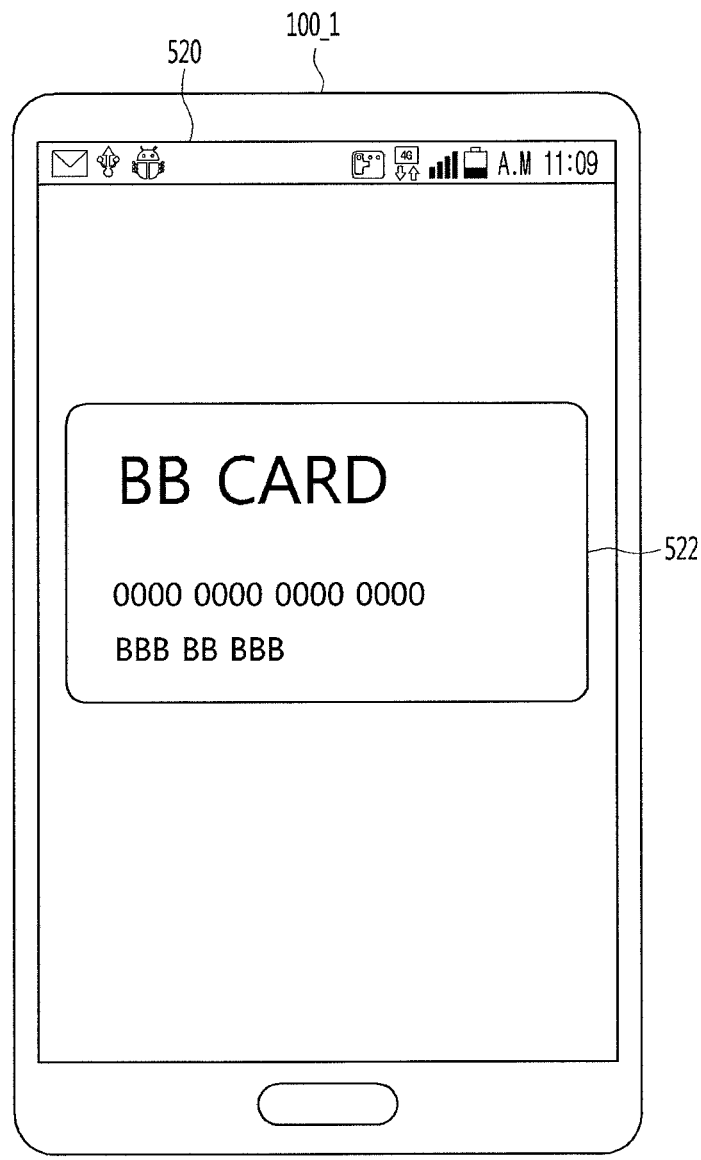

FIGS. 18A and 18B are views showing an example of a transmission request for payment data stored in the first mobile terminal.

Referring to FIG. 18A, after the first mobile terminal 100_1 and the second mobile terminal 100_2 are connected according to the embodiment shown in FIG. 5, a payment application may be executed in the first mobile terminal 100_1, and while the payment application is being executed, the first mobile terminal 100_1 and the second mobile terminal 100_2 may be connected to each other. In this case, the controller 180_1 of the first mobile terminal 100_1 may receive a transmission request for at least one of the payment data images 521 and 522 displayed on the execution screen 520 for the payment application. For example, the transmission request may be a touch drag input for the payment data image 521.

Referring to FIG. 18B, when the payment data is transmitted to the second mobile terminal 100_2 and a restoration notification is received from the second mobile terminal 100_2, the controller 180_1 may display the execution screen 520 from which an image 521 corresponding to the payment data restored in the second mobile terminal 100_2 has been deleted.

Figure 19A:
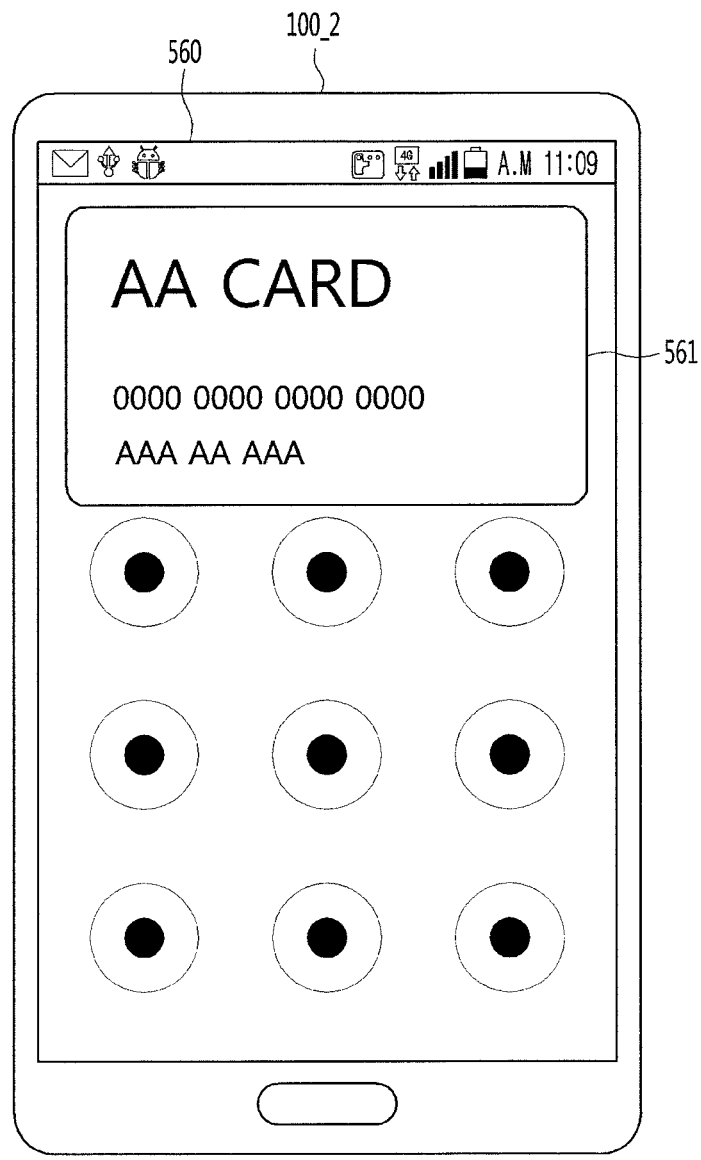
FIGS. 19A to 19C are views showing examples of a notification displayed when the second mobile terminal receives payment data from the first mobile terminal.
Figure 19B:
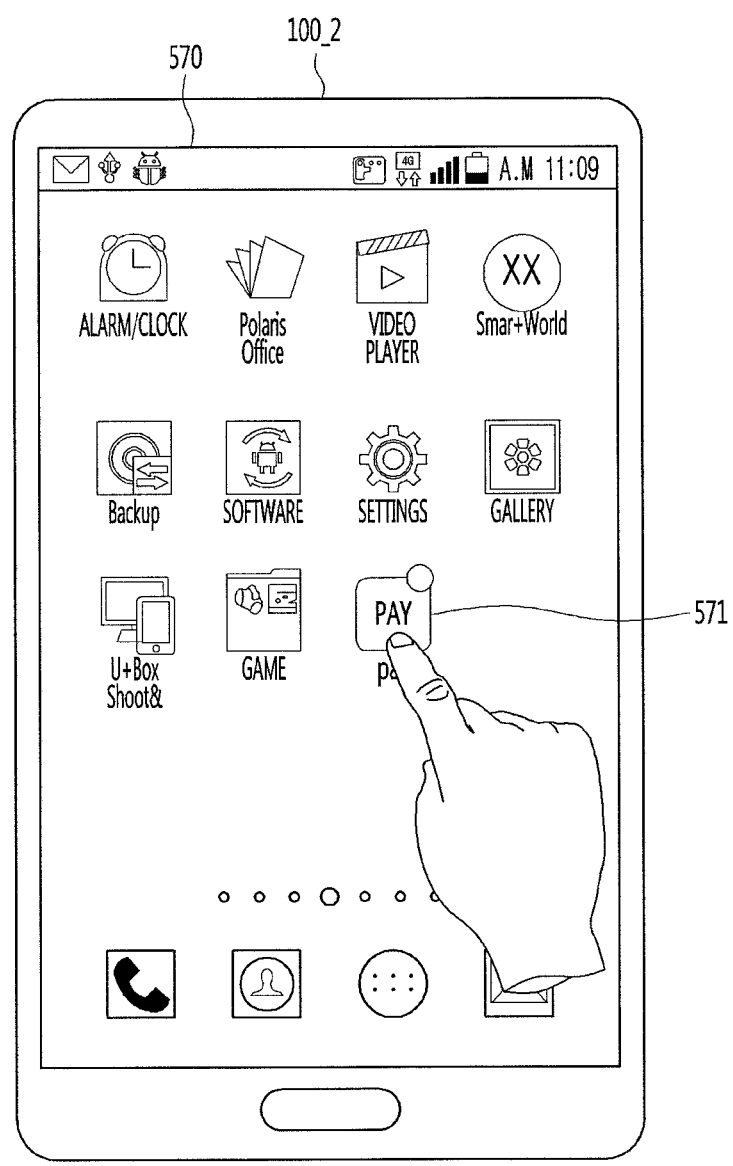
Figure 19C:
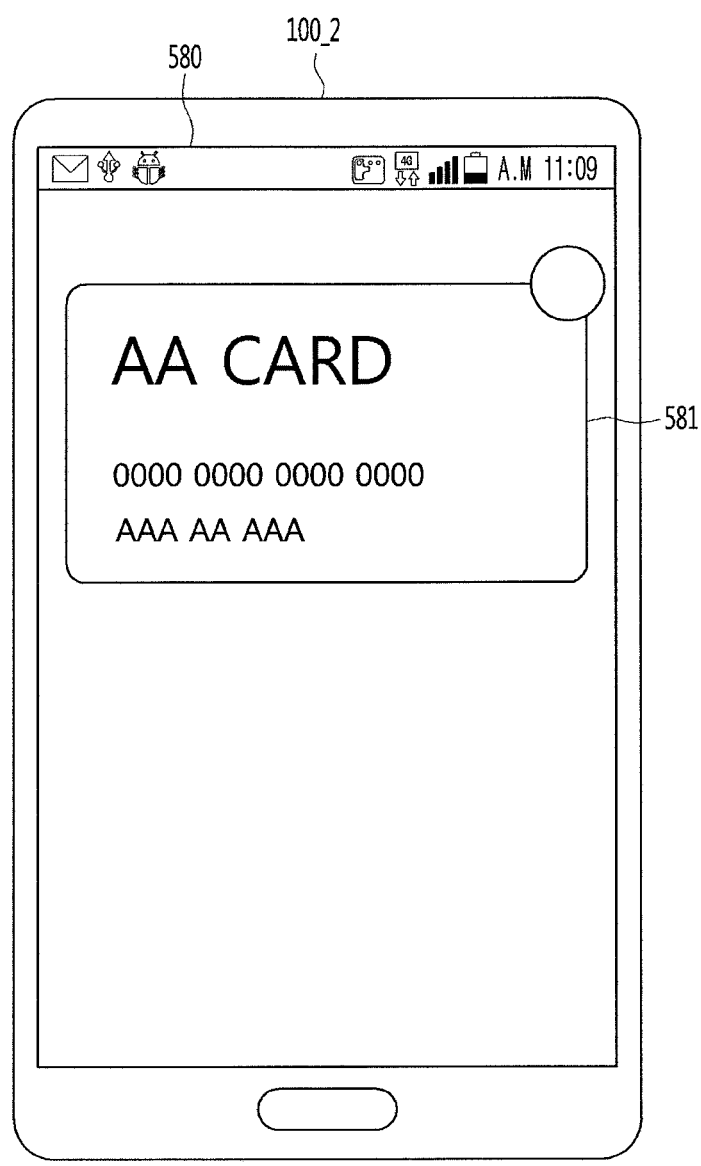

FIGS. 19A to 19C are views showing examples of a notification displayed when the second mobile terminal receives payment data from the first mobile terminal.

Referring to FIG. 19A to FIG. 19C, when payment data is received from the first mobile terminal 100_1, the controller 1802 of the second mobile terminal 100_2 may display a notification for restoring the received payment data.

For example, the controller 180_2 may display an image 561 corresponding to the received payment data on a home screen or a lock screen 560. Alternatively, the controller 180_2 may display a badge on an icon 571 of an application related to the received payment data.

When an input (e.g., a touch input) for the image 561 of FIG. 19A or the application icon 571 of FIG. 19B, the controller 180_2 may execute the application and may display, on the execution screen 580, payment data images 581 and 582 corresponding to the payment data to be restored. Depending on the embodiment, the controller 180_2 may display a badge on a payment data image corresponding to the payment data to be restored.

That is, when the payment data to be restored is present, the controller 180_2 may inform a user by displaying an image, an icon, or a badge.

Figure 20:
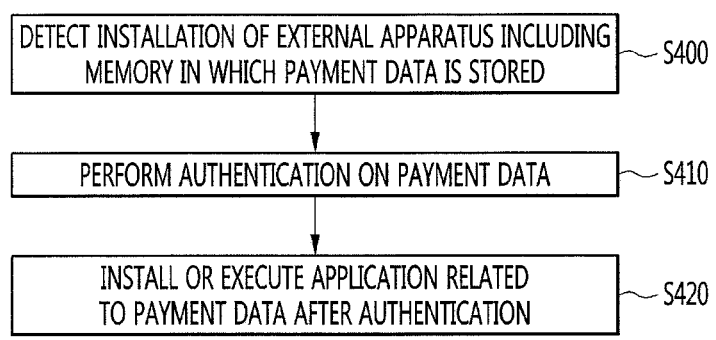
FIG. 20 is a flowchart illustrating an operation performed when a mobile terminal detects the installation of an external apparatus having payment data.

FIG. 20 is a flowchart illustrating an operation performed when a mobile terminal detects the installation of an external apparatus having payment data.

Referring to FIG. 20, the mobile terminal 100 may detect installation of an external apparatus in which payment is stored (S400). The external apparatus may include a memory for storing the payment data. The external apparatus may include a storage medium for connecting to an SD card, a SIM card, or a mobile terminal.

The mobile terminal 100 may perform an authentication operation on the payment data stored in the external apparatus on the basis of a result of the detection (S410) and may automatically execute an application related to the payment data or automatically install the application in the mobile terminal 100 after the authentication is completed (S420).

The embodiment shown in FIG. 20 will be described in detail with reference to FIGS. 21A to 21C.

Figure 21A:
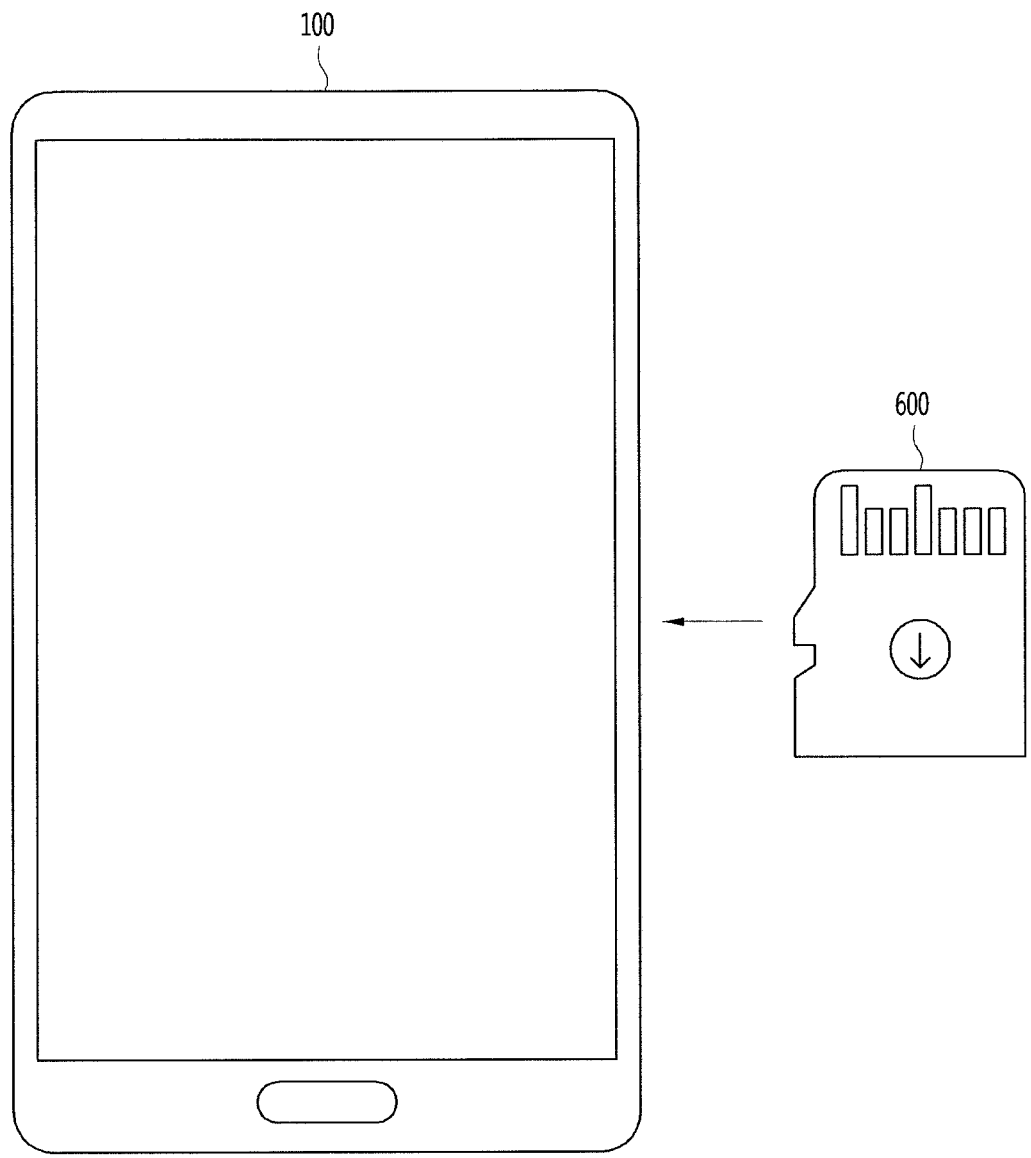
FIGS. 21A to 21C are views showing the operation of the mobile terminal shown in FIG. 20.
Figure 21B:
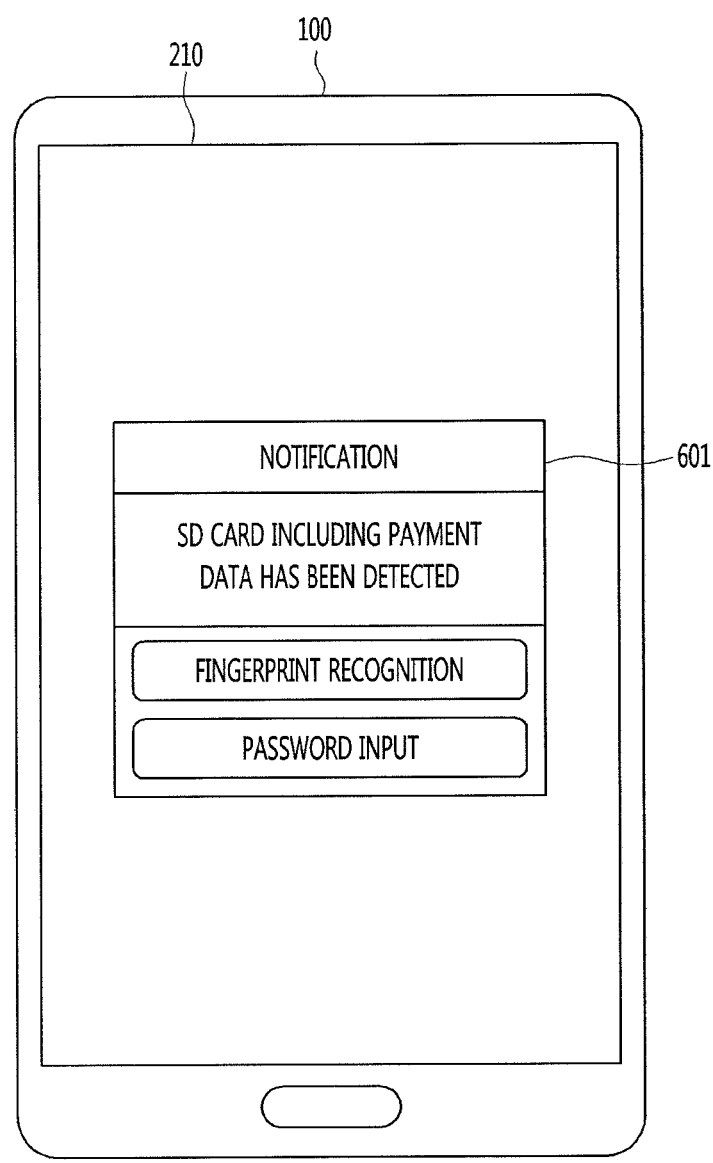
Figure 21C:
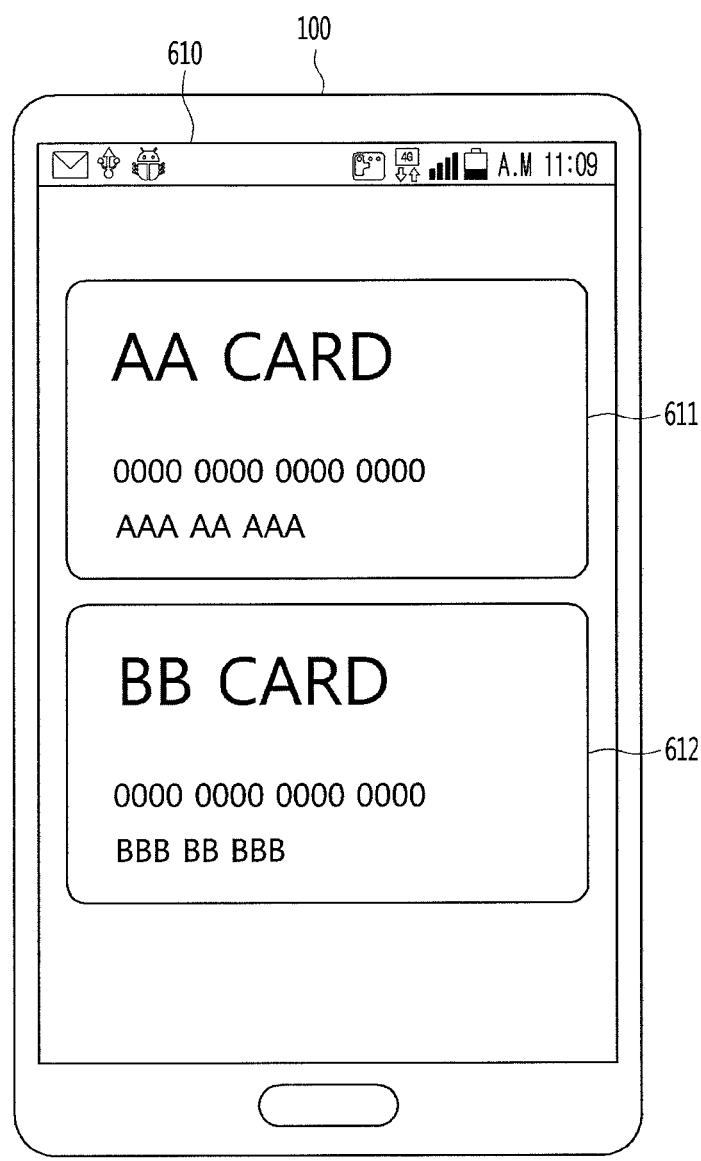

FIGS. 21A to 21C are views showing the operation of the mobile terminal shown in FIG. 20.

Referring to FIG. 21A, an external apparatus (e.g., an SD card) 600 in which the payment data (e.g., card information) is stored my be installed in the mobile terminal 100. The controller 180 of the mobile terminal 100 may detect the installation of the SD card 600.

Referring to FIG. 21B, when the installation of the SD card 600 including the payment data is detected, the controller 180 may display a notification window 601 for informing a user that the SD card 600 is installed and performing authentication on the payment data. The notification window 601 may be displayed in the form of a pop-up window, but is not limited thereto.

The authentication operation based on the displayed notification window 601 is similar to the authentication operation shown in FIG. 15C or the like, and thus a description thereof will be omitted.

Referring to FIG. 21C, as the authentication is completed, the controller 180 may automatically execute a payment application related to the payment data. The controller 180 may display, on the execution screen 610 for the payment application, payment data images 611 and 612 corresponding to the payment data stored in the SD card 600. The controller 180 may receive a payment function performing request on the basis of the displayed payment data images 611 and 612 and may perform a payment function in response to the received request.

Depending on the embodiment, when the payment application related to the payment data is not installed in the mobile terminal 100, the controller 180 may automatically install the payment application and may execute the installed payment application.

According to the embodiment shown in FIGS. 20 to 21C, since payment data for using a payment service is stored not in a mobile terminal but in a separate external apparatus such as an SD card or chip, it is possible to improve security of important data. Also, when the external apparatus is installed in a mobile terminal, the payment application related to the payment date may be automatically installed or executed after user authentication. Thus, it is possible to prevent the usability from being lowered.

According to an embodiment of the present invention, it is possible to implement the above-described method, as a code readable by a processor, in a medium on which programs are recorded. Examples of a processor readable medium include a random access memory (ROM), a random access memory (RAM), a CD-ROM, a magnetic tape, a floppy disk, and an optical data storage. Further, the medium may be implemented in the form of a carrier wave (e.g., transmission through the Internet).

The configurations and methods of the above-described embodiments may be applied to the mobile terminal described above in a limited manner, but the embodiments may be variously modified such that all or some of the embodiments are selectively combined.

The invention claimed is:

1. A mobile terminal for performing backup and restoration of data, the mobile terminal comprising:
a wireless communication unit configured to connect to another mobile terminal;
a display unit;
a memory configured to store a backup application for performing the backup and restoration of the data; and
a controller configured to:
make a request to perform near field communication (NFC) tagging with the other mobile terminal in order to receive a backup file including the data from the other mobile terminal,
connect to the other mobile terminal through the wireless communication unit on the basis of the NFC tagging, and
restore the data included in the backup file received from the other mobile terminal,
wherein the controller is further configured to:
request authentication for restoring payment data including card information for payment when the payment data is included in the backup file received from the other mobile terminal,
transmit a restoration notification for deleting the payment data stored in the other mobile terminal to the other mobile terminal when the payment data is restored as the authentication is completed, and
request a server, which provides a payment service using the payment data, to register information regarding the mobile terminal as terminal information with respect to the payment data, by changing the terminal information from information regarding the other mobile terminal to the information regarding the mobile terminal.

2. The mobile terminal of claim 1, wherein the controller checks whether the mobile terminal is in an initial state and whether the backup file is present in the mobile terminal in response to an execution request for the backup application,
wherein the controller makes a request for the NFC tagging with the other mobile terminal when the mobile terminal is in the initial state and the backup file is not present, and
wherein the initial state is a state which corresponds to a reference time after an initial setting completion time of the mobile terminal and in which data restoration is not performed.

3. The mobile terminal of claim 2, wherein when the mobile terminal is in the initial state, the controller displays an item for inducing execution of the backup application on the display unit.

4. The mobile terminal of claim 1, wherein the mobile terminal and the other mobile terminal are connected through Wi-Fi Direct,
wherein the controller transmits Wi-Fi access point information, a media access control (MAC) address, and version information of the backup application to the other mobile terminal during the NFC tagging, and
wherein the controller connects to the other mobile terminal through the Wi-Fi Direct on the basis of a result of the transmission.

5. The mobile terminal of claim 4, wherein when the connection to the other mobile terminal fails, the controller displays, on the display unit, a message for inducing installation or version update of the backup application of the other mobile terminal.

6. The mobile terminal of claim 1, wherein the controller receives the backup file transmitted when an application icon displayed on a screen of the other mobile terminal is selected and restores application backup data included in the received backup file, and wherein the application backup data is data related to an application corresponding to the selected application icon.

7. The mobile terminal of claim 1, wherein the controller detects installation of an external apparatus in which payment data is stored, and requests authentication of the payment data on the basis of a result of the detection, and
wherein the controller automatically executes or installs an application associated with the payment data when the authentication is completed.

8. The mobile terminal of claim 1, wherein the controller receives a backup request for payment data stored in the mobile terminal, requests authentication for encryption and transmission of the payment data in response to the received backup request, transmits a backup file including the payment data to the other mobile terminal connected to the mobile terminal when the authentication is completed, and deletes the payment data when a restoration notification indicating that the payment data has been restored is received from the other mobile terminal.

9. A method of backing up and restoring data of a mobile terminal, the method comprising:
requesting NFC tagging with another mobile terminal in order to receive a backup file including data to be restored from the other mobile terminal;
connecting to the other mobile terminal on the basis of the NFC tagging;
receiving the backup file from the other mobile terminal;
requesting authentication for restoring payment data including card information for payment when the payment data is included in the backup file received from the other mobile terminal;
restoring the data included in the received backup file;
transmitting a restoration notification for deleting the payment data stored in the other mobile terminal to the other mobile terminal when the payment data is restored as the authentication is completed; and
requesting a server, which provides a payment service using the payment data, to register information regarding the mobile terminal as terminal information with respect to the payment data, by changing the terminal information from information regarding the other mobile terminal to the information regarding the mobile terminal.

10. The method of claim 9, wherein the requesting of the NFC tagging comprises:
receiving an execution request for a backup application installed in the mobile terminal;
checking whether the mobile terminal is in an initial state and whether the backup file is present in the mobile terminal in response to the received execution request; and
requesting the NFC tagging with the other mobile terminal when the mobile terminal is in the initial state and the backup file is not present, and
wherein the initial state is a state which corresponds to a reference time after an initial setting completion time of the mobile terminal and in which data restoration is not performed.

11. The method of claim 10, wherein the receiving of the execution request for the backup application comprises:
displaying an item for inducing execution of the backup application when the mobile terminal is in the initial state; and
receiving an execution request for the backup application on the basis of the displayed item.

12. The method of claim 9, wherein the connecting to the other mobile terminal comprises:
transmitting Wi-Fi access point information, a media access control (MAC) address, and version information of a backup application installed in the mobile terminal to the other mobile terminal during the NFC tagging; and
connecting to the other mobile terminal through Wi-Fi Direct on the basis of a result of the transmission.

13. The method of claim 12, wherein the connecting to the other mobile terminal further comprises displaying a message for inducing installation or version update of the backup application of the other mobile terminal when the connection to the other mobile terminal fails.

14. The method of claim 9, wherein the receiving of the backup file comprises receiving the backup file transmitted when an application icon displayed on a screen of the other mobile terminal is selected, and
wherein the backup file includes data related to an application corresponding to the selected application icon.

15. The method of claim 9, further comprising:
detecting installation of an external apparatus in which payment data is stored;
requesting authentication of the payment data on the basis of a result of the detection; and
automatically executing or installing an application associated with the payment data when the authentication is completed.

16. The method of claim 9, further comprising:
receiving a backup request for the payment data stored in the mobile terminal;
requesting authentication for encryption and transmission of the payment data in response to the received backup request;
transmitting a backup file including the payment data to the other mobile terminal connected to the mobile terminal when the authentication is completed; and
deleting the payment data when a restoration notification indicating that the payment data has been restored is received from the other mobile terminal.

17. A non-transitory storage medium configured to store a program readable by a computer for performing the data backup and restoration method of claim 9.

* * * * *